US011773218B2

(12) United States Patent
Louis et al.

(10) Patent No.: US 11,773,218 B2
(45) Date of Patent: Oct. 3, 2023

(54) METHOD OF MAKING A PEEK-PEMEK COPOLYMER AND COPOLYMER OBTAINED FROM THE METHOD

(71) Applicant: SOLVAY SPECIALTY POLYMERS USA, LLC, Alpharetta, GA (US)

(72) Inventors: Chantal Louis, Alpharetta, GA (US); Mohammad Jamal El-Hibri, Atlanta, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 508 days.

(21) Appl. No.: 16/771,701

(22) PCT Filed: Dec. 20, 2018

(86) PCT No.: PCT/EP2018/086362
§ 371 (c)(1),
(2) Date: Jun. 11, 2020

(87) PCT Pub. No.: WO2019/122226
PCT Pub. Date: Jun. 27, 2019

(65) Prior Publication Data
US 2021/0179777 A1 Jun. 17, 2021

Related U.S. Application Data

(60) Provisional application No. 62/608,245, filed on Dec. 20, 2017.

(30) Foreign Application Priority Data

Feb. 21, 2018 (EP) ..................... 18157845

(51) Int. Cl.
| | | |
|---|---|---|
| *C08G 65/40* | (2006.01) | |
| *B33Y 70/00* | (2020.01) | |
| *B29C 64/118* | (2017.01) | |
| *C08K 3/26* | (2006.01) | |
| *C08F 292/00* | (2006.01) | |
| *C08K 3/04* | (2006.01) | |
| *C08K 7/06* | (2006.01) | |
| *C08K 7/14* | (2006.01) | |
| *C09D 161/00* | (2006.01) | |
| *B33Y 70/10* | (2020.01) | |
| *C08K 7/02* | (2006.01) | |
| *C09D 161/16* | (2006.01) | |
| *B33Y 10/00* | (2015.01) | |
| *B29K 71/00* | (2006.01) | |
| *B29K 309/08* | (2006.01) | |

(52) U.S. Cl.
CPC ........ *C08G 65/4093* (2013.01); *B29C 64/118* (2017.08); *B33Y 70/00* (2014.12); *B33Y 70/10* (2020.01); *C08F 292/00* (2013.01); *C08G 65/4012* (2013.01); *C08K 3/04* (2013.01); *C08K 3/26* (2013.01); *C08K 7/02* (2013.01); *C08K 7/06* (2013.01); *C08K 7/14* (2013.01); *C09D 161/00* (2013.01); *C09D 161/16* (2013.01); *B29K 2071/00* (2013.01); *B29K 2309/08* (2013.01); *B33Y 10/00* (2014.12); *C08K 2003/262* (2013.01)

(58) Field of Classification Search
CPC . C08G 65/4012; C08F 292/00; B29C 64/118; C08K 7/02; B33Y 70/10; C09D 161/16
USPC ....................................................... 264/308
See application file for complete search history.

(56) References Cited

U.S. PATENT DOCUMENTS

| | | | |
|---|---|---|---|
| 9,133,111 B2 | 9/2015 | Louis et al. | |
| 2017/0198104 A1* | 7/2017 | Bheda ................ | B29C 48/022 |
| 2017/0362379 A1* | 12/2017 | El-Hibri ............. | C08G 65/40 |

FOREIGN PATENT DOCUMENTS

| | | |
|---|---|---|
| EP | 1559542 A1 | 8/2005 |
| EP | 1459882 B1 | 2/2010 |
| JP | 1198624 A | 8/1989 |
| JP | 2004307629 A | 11/2004 |
| WO | 2009021918 A1 | 2/2009 |
| WO | 2011123790 A1 | 10/2011 |
| WO | 2016092087 A1 | 6/2016 |
| WO | 2017153290 A1 | 9/2017 |
| WO | WO 2019/122160 A1 | 6/2019 |

OTHER PUBLICATIONS

Lee et al., Journal of the Korean Fiber Society, 50-64, Oct. 28, 2012. (Year: 2012).*
Rao et al., Polymer, 33, 13, 2834-2839, 1992. (Year: 1992).*
U.S. Appl. No. 16/771,698, Chantal Louis, filed Jun. 11, 2020, WO 2019/122160.
ASTM D3418-03—Standard Test Method for Transition Temperatures of Polymers by Differential Scanning Calorimetry, 2003, 7 pages.

(Continued)

*Primary Examiner* — Hui H Chin
(74) *Attorney, Agent, or Firm* — Osha Bergman Watanabe & Burton LLP

(57) ABSTRACT

A method of making a PEEK-PEmEK copolymer having $R_{PEEK}$ and $R_{PEmEK}$ repeat units in a molar ratio $R_{PEEK}/R_{PEmEK}$ ranging from 95/5 to 45/55, the PEEK-PEmEK copolymer obtained from the method and the polymer composition including the PEEK-PEmEK copolymer, at least one reinforcing filler, at least one additive, or a combination thereof, shaped articles including the polymer composition, polymer-metal junctions including the polymer composition. Also described are methods of making the polymer composition, methods of making the shaped articles, and methods of making the polymer-metal junctions.

18 Claims, No Drawings

(56) References Cited

OTHER PUBLICATIONS

ASTM E794-06—Standard Test Method for Melting and Crystallization Temperatures by Thermal Analysis, 2006, 4 pages.
ASTM E793-06—Standard Test Method for Enthalpies effusion and Crystallization by Differentail Scanning Calorimetry, 2006, 4 pages.
Murphy J., in "Additives for Plastics Handbook", 2nd Edition, 2001, Chapter 5.2.3., p. 43-48—Elsevier Advanced Technology.
Rama Rao M. et al., "Synthesis, characterization and thermal degradation studies of poly(ether ether ketone) copolymers", Polymer., vol. 33 No. 13, 1992, pp. 2834-2839, Butterworth-Heinemann Ltd.
Lee C.-J. et al., "Structure and Properties of Poly(arylene etherketone)s containing Resorcinol units", Journal of the Korean Fiber Society, 1993, pp. 50-64.

\* cited by examiner

METHOD OF MAKING A PEEK-PEMEK COPOLYMER AND COPOLYMER OBTAINED FROM THE METHOD

CROSS-REFERENCE TO RELATED APPLICATIONS

This application is a U.S. national stage entry under 35 U.S.C. § 371 of International Application No. PCT/EP2018/086362 filed Dec. 20, 2018, which claims priority to U.S. provisional application 62/608,245 filed on Dec. 20, 2017 and to European application 18157845.1 filed on Feb. 21, 2018, the whole content of each of these applications being incorporated herein by reference for all purposes.

FIELD OF THE INVENTION

The present invention relates a method of making PEEK-PEmEK copolymers, PEEK-PEmEK copolymers obtained from the method, polymer compositions including the PEEK-PEmEK copolymers, shaped articles including the polymer compositions, polymer-metal junctions including the polymer compositions, and associated methods.

BACKGROUND

Poly(aryl ether ketone) polymers (PAEK), such as poly(ether ether ketone) polymers (PEEK), are known for their high temperature performance and excellent chemical resistance; however, because of their melting temperatures (Tm) which are generally too high, their processing temperatures require costlier, energy-intensive processing. Their high melting temperatures (Tm) can also result in polymers being unstable during processing, especially when the polymers must be kept at a temperature above or just below their melting temperature for extended periods of time. Examples of such applications include additive manufacturing (AM), also called 3D printing, powder coatings and continuous fiber thermoplastic composites.

Accordingly, a need exists for new PAEK polymers that can be reliably processed at lower temperatures, and which retain their technical properties, notably their chemical resistance and mechanical properties (when compared with conventional PAEK polymers).

DETAILED DESCRIPTION OF PREFERRED EMBODIMENTS

The present invention relates to a method of making a PEEK-PEmEK copolymer having $R_{PEEK}$ and $R_{PEmEK}$ repeat units in a molar ratio $R_{PEEK}/R_{PEmEK}$ ranging from 95/5 to 45/55, a PEEK-PEmEK copolymer obtained from the method, a polymer composition including the PEEK-PEmEK copolymer and at least one reinforcing filler, at least one additive, or a combination thereof. Also described are methods of making the polymer composition, shaped articles including the polymer composition, and polymer-metal junctions including the polymer composition.

The method of the present invention comprises the condensation of at least one difluoro-compound with a mixture of at least two di-hydroxy compounds, in a solvent comprising diphenylsulfone as the condensation solvent. The difluoro-compound is in excess relative to the di-hydroxy compounds, in the reaction mixture. The polycondensation is terminated (or stopped) using at least one end-capping agent.

The present invention also relates to the copolymer obtainable by or prepared according to the method described herein.

Improved melt stability and/or improved crystallinity may be observed under these conditions. Mechanical properties of semi-crystalline resins are linked to the crystallinity level. The crystallinity level of the copolymer can be measured using the heat of fusion ($\Delta H$), also called enthalpy of fusion, as measured by DSC. For PEEK-PEmEK copolymer to be useful in industrial applications, the acceptable heat of fusion may advantageously be at least 15 J/g.

The PEEK-PEmEK copolymers described in the present invention having a molar ratio $R_{PEEK}/R_{PEmEK}$ ranging from 95/5 to 45/55 advantageously exhibit a relationship between melting temperature (Tm) and heat of fusion ($\Delta H$) satisfying the inequality:

$$\Delta H \geq -0.0005(Tm)^2 + 1.008(Tm) - 226.33$$

where:

$\Delta H$ is the heat of fusion in J/g determined as the area under the melting endotherm on the second heat scan in a differential scanning calorimeter (DSC) according to ASTM D3418-03 and E793-06, using heating and cooling rates of 20° C./min, and Tm is the melting temperature of the PEEK-PEmEK copolymer in ° C. measured as the peak temperature of the melting endotherm on the second heat scan in a differential scanning calorimeter (DSC) according to ASTM D3418-03 and E794-06 and using heating and cooling rates of 20° C./min. PEEK-PEmEK copolymers meeting this inequality may have, for example, a higher crystallinity (and associated chemical resistance) at a given melting temperature (Tm), as compared with other low melting temperature (Tm) PAEKs known in the art, such as PEEK-PEDEK copolymers, or as compared with other PEEK-PEmEK copolymers described in the prior art and obtained by different processes. Reference can be made to JP 11/98624 (IDEMITSU) in which the method takes place in NMP, to Rao et al., 1992 in which the method takes place in sulfolane and to Lee et al., 1993 in which the difluoro-compound is not in excess relative to the di-hydroxy compounds and the process does not comprise a termination step. PEEK-PEmEK copolymers of the present invention may also have better mechanical properties, for example better modulus of elasticity and a better tensile strength, as compared with the PEEK-PEmEK copolymers of the prior art. PEEK-PEmEK copolymers of the present invention may also have a concentration in inert end groups [inert EG] of at least 160 µmol/g (as determined by elemental analysis, NMR or other techniques).

PEEK-PEmEK Copolymer

As used herein, a "PEEK-PEmEK copolymer" comprises at least 50 mol. %, collectively, of repeat units ($R_{PEEK}$) and repeat units ($R_{PEmEK}$), relative to the total number of moles of repeat units in the PEEK-PEmEK copolymer. In some embodiments, the PEEK-PEmEK copolymer comprises at least 60 mol. %, at least 70 mol. %, at least 80 mol. %, at least 90 mol. %, at least 95 mol. %, and most preferably at least 99 mol. % of repeat units ($R_{PEEK}$) and ($R_{PEmEK}$), relative to the total number of moles of repeat units in the PEEK-PEmEK copolymer.

Repeat unit ($R_{PEEK}$) is represented by formula

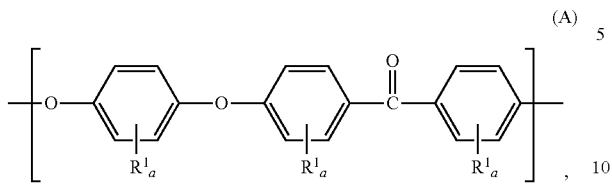

(A)

repeat unit ($R_{PEmEK}$) is represented by formula:

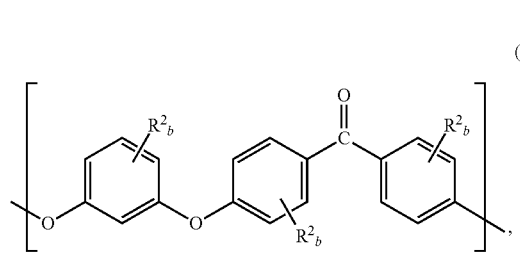

(B)

where each $R^1$ and $R^2$, equal to or different from each other, is independently at each occurrence selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and each a and b is independently selected from the group consisting of integers ranging from 0 to 4.

In some embodiments, each a is zero, such that the repeat units ($R_{PEEK}$) are repeat units of formula:

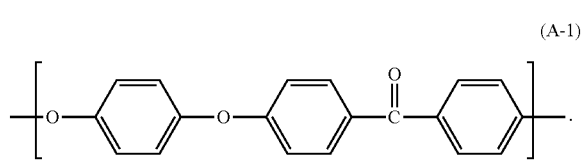

(A-1)

In some embodiments, each b is zero, such that the repeat units ($R_{PEmEK}$) are repeat units of formula:

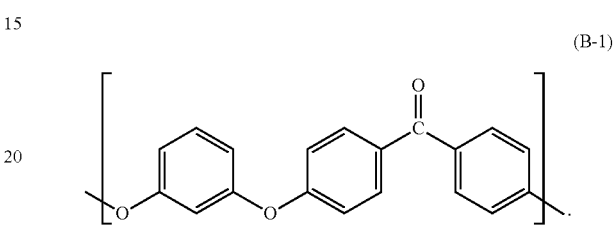

(B-1)

Preferably, repeat units ($R_{PEEK}$) are repeat units of formula (A-1), and repeat units ($R_{PEmEK}$) are repeat units of formula (B-1).

The PEEK-PEmEK copolymer of the present invention may additionally comprise repeat units ($R_{PAEK}$) different from repeat units ($R_{PEEK}$) and ($R_{PEmEK}$), as above detailed. In such case, the amount of repeat units ($R_{PAEK}$) can be comprised between 0.1 and 5 mol. %, with respect to the total number of moles of repeat units of PEEK-PEmEK copolymer.

When repeat units ($R_{PAEK}$) different from repeat units ($R_{PEEK}$) and ($R_{PEmEK}$) are present in the PEEK-PEmEK copolymer of the present invention, these repeat units ($R_{PAEK}$) generally comply with any of the following formulae (K-A) to (K-M) herein below:

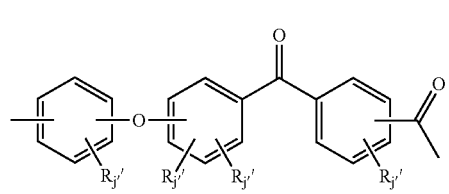

(K-A)

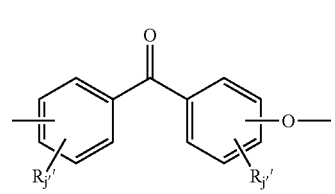

(K-B)

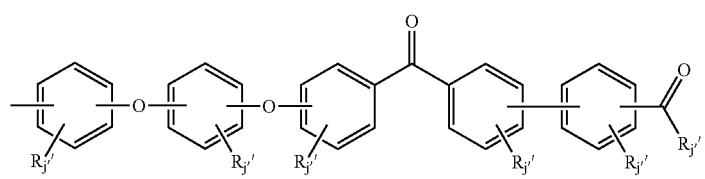

(K-C)

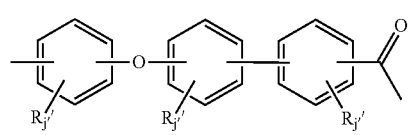

(K-D)

-continued
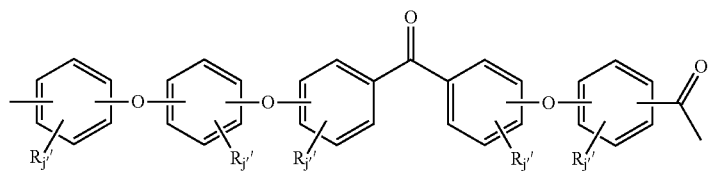
(K-E)
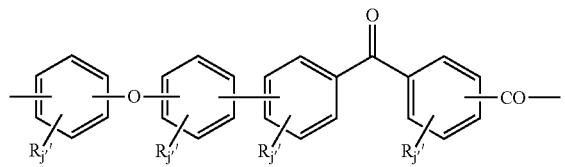
(K-F)
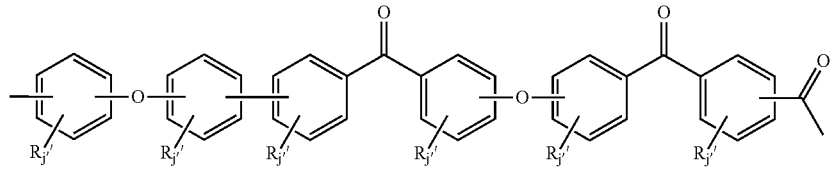
(K-G)
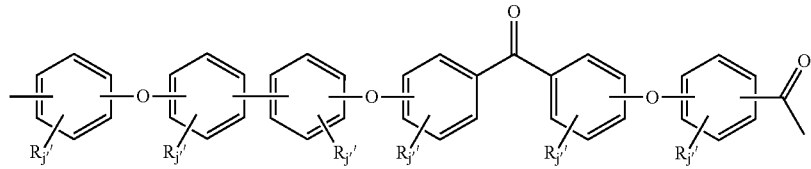
(K-H)
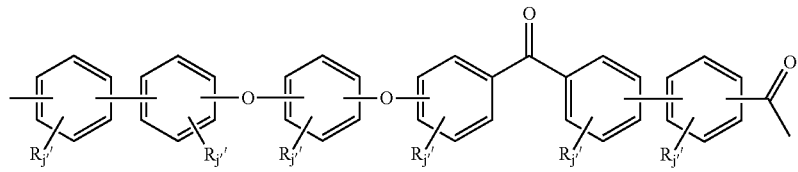
(K-I)
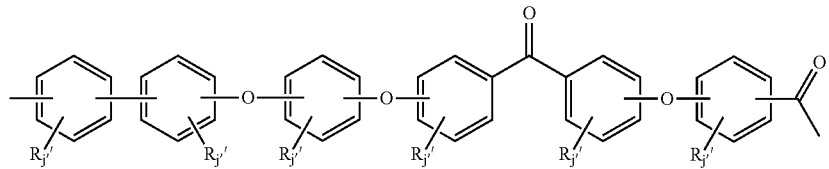
(K-J)
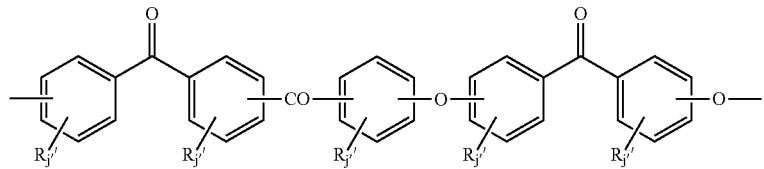
(K-K)
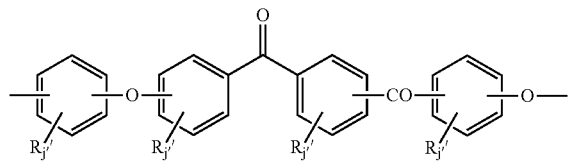
(K-L)
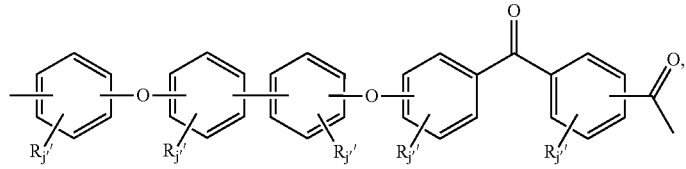
(K-M)

wherein in each of formulae (K-A) to (K-M) above, each of R', equal to or different from each other, is independently selected at each occurrence from a $C_1$-$C_{12}$ group optionally comprising one of more than one heteroatoms; sulfonic acid and sulfonate groups; phosphonic acid and phosphonate groups; amine and quaternary ammonium groups; and each of j', equal to or different from each other, is independently selected at each occurrence from 0 and an integer of 1 to 4, preferably j' being equal to zero.

It is nevertheless generally preferred for the PEEK-PEmEK copolymer of the present invention to be essentially composed of repeat units ($R_{PEEK}$) and ($R_{PEmEK}$), as above detailed. Thus, in some embodiments, the PEEK-PEmEK copolymer consists essentially of repeat units $R_{PEEK}$ and $R_{PEmEK}$ As used herein, the expression "consists essentially of repeat units $R_{PEEK}$ and $R_{PEmEK}$" means that any additional repeat unit different from repeat units $R_{PEEK}$ and $R_{PEmEK}$, as above detailed, may be present in the PEEK-PEmEK copolymer in amount of at most 1 mol. %, at most 0.5 mol. % or at most 0.25 mol. %, relative to the total number of moles of repeat units in the PEEK-PEmEK copolymer, and so as not to substantially alter the advantageous properties of the PEEK-PEmEK copolymer.

Repeat units $R_{PEEK}$ and $R_{PEmEK}$ are present in the PEEK-PEmEK copolymer in a $R_{PEEK}$/$R_{PEmEK}$ molar ratio ranging from 95/5 to 45/55, preferably from 95/5 to 50/50, from 90/10 to 50/50, from 90/10 to 58/42.

In some embodiments, the PEEK-PEmEK copolymer has a melting temperature (Tm) of less than or equal to 335° C., preferably less than or equal to 325° C. The melting temperatures described herein are measured as the peak temperature of the melting endotherm on the second heat scan in a differential scanning calorimeter (DSC) according to ASTM D3418-03 and E794-06, and using heating and cooling rates of 20° C./min.

In some embodiments, the PEEK-PEmEK copolymer has as heat of fusion (ΔH) of at least 1 J/g, preferably at least 5 J/g, at least 10 J/g, at least 15 J/g, or at least 25 J/g. The heats of fusion described herein are determined as the area under the melting endotherm on the second heat scan in a differential scanning calorimeter (DSC) according to ASTM D3418-03 and E793-06, with heating and cooling rates of 20° C./min. In some aspects, the PEEK-PEmEK copolymer has as heat of fusion (ΔH) of at most 65 J/g, preferably at most 60 J/g.

In some embodiments, the PEEK-PEmEK copolymer exhibits a tensile modulus of at least 550 ksi, preferably at least 600 ksi as measured according to ASTM D638 at room temperature.

In some embodiments, the PEEK-PEmEK copolymer has a glass transition temperature (Tg) of less than or equal to 155° C., preferably less than or equal to 145° C., less than or equal to 140° C., or less than or equal to 135° C. as measured in a differential scanning calorimeter (DSC) according to ASTM D3418-03 and E1356-03.

In some embodiments, the PEEK-PEmEK copolymer has a melt viscosity (MV) as measured according to ASTM D3835 at 410° C., 46.3 s$^{-1}$ of at least 0.09 kN/m, more preferably at least 0.10 kN/m² and most preferably at least 0.15 kN/m².

In some embodiments, the PEEK-PEmEK copolymer has a melt viscosity (MV) as measured according to ASTM D3835 at 410° C., 46.3 s$^{-1}$ of at most 5.0 kN/m, more preferably at most 3.0 kN/m², at most 2.5 kN/m, even most preferably at most 1.5 kN/m².

In some embodiments, the PEEK-PEmEK copolymer has a concentration in inert end groups [inert EG] of at least 160 μmol/g, more preferably at least 163 μmol/g, most preferably at least 165 μmol/g, even most preferably at least 168 μmol, determined by elemental analysis, NMR or other techniques. When elemental analysis is used, other elemental analysis methods can be used to correct the concentration for inorganic salts, such as sodium fluoride or potassium fluoride.

Inert groups can be represented by formula (G):

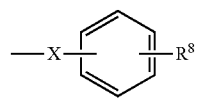

(G)

wherein
X is O or a bond,
$R^8$ is C(O)—Ar—$R^9$, O—Ar—$R^9$, $SO_2$—Ar—$R^9$, Ar—$R^9$, an alkyl (for example a C1-C10 alkyl or a C1-C5 alkyl) or H, with Ar being an arylene group comprising at least one benzene ring (i.e. one benzene ring or several benzene rings), and
$R^9$ is F, Cl or H.

Preferably, $R^8$ is C(O)—Ar—$R^9$, Ar—$R^9$ or H with $R^9$ being F or H. More preferably, $R^9$ is F.

The copolymer of the present invention may have several distinct inert end groups. As an example, the copolymer of the present invention may have an inert end group of formula (G) wherein $R^8$ is —C(O)—Ar—$R^9$ (from the use of difluor-compound in the polymerization), as well as another inert group of formula (G) wherein $R^8$ is H (from the use of phenol as an end-capping agent). In this case, the concentration in inert end groups [inert EG] includes the sum of the concentrations for each inert end group [inert EG] present in the polymer (eq1).

$$[\text{inert } EG]\text{total} = \sum_i [\text{inert } EG]i$$

In some embodiments, the PEEK-PEmEK copolymer has a concentration in inert end groups [inert EG]*MV$^{0.05}$ of at least 165 (μmol/g)(kN/m²)$^{0.05}$, more preferably at least 168 (μmol/g)(kN/m²)$^{0.05}$.

Typical analytical techniques to measured inert end groups are elemental analysis (in the case where $R^9$ is F or Cl) and NMR (in the case where $R^9$ is F or $R^8$ or $R^9$ is H). For example, the NMR method disclosed in patent application WO 2009/021918 A1 (incorporated herein by reference for all purposes) can be used for determining inert EG where $R^9$ is F. Alternatively, using the same NMR conditions as in SAP 2007/10 but recording an $^1$H NMR spectrum at 400 MHz, inert end groups with $R^8$ is H can be quantified by integration of the signal around 7.5-7.6 ppm chemical shift relative to tetramethylsilane.

In some embodiments, the PEEK-PEmEK copolymer of the present invention presents an ultimate tensile strength meeting the following inequality Ultimate tensile strength (@yield or at break)≥2.362*Tm²+1489*Tm−220500 wherein
ultimate tensile strength is in psi and is the highest value or tensile strength at yield or at break measured per ASTM D638 on compression molded specimens at low speed (as described in the examples), and Tm is the melting point measured on DSC $2^{nd}$ heat scan at 20° C./min.

Method of Making the PEEK-PEmEK Copolymer

The present invention relates to a method of making a PEEK-PEmEK copolymer, as described above, comprising reacting at least one difluoro-compound of formula (C):

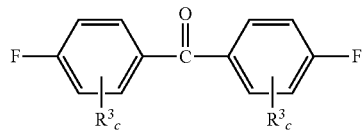

(C)

with a mixture of di-hydroxy compounds of formulas (D) and (E):

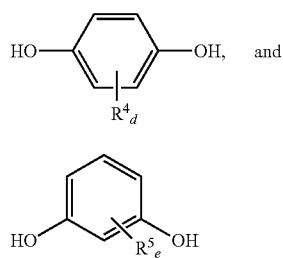

in a molar ratio (D)/(E) ranging from 95/5 to 45/55, in a molar ratio (C)/(D)+(E)≥1.005, preferably ≥1.008, more preferably ≥1.010, even more preferably ≥1.015, wherein each $R^3$, $R^4$, and $R^5$, equal to or different from each other, is independently at each occurrence selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium, and each c, d, and e is independently selected from the group consisting of integers ranging from 0 to 4, in a polar organic solvent in the presence of a base, such as, for example, $Na_2CO_3$, $K_2CO_3$, or a combination thereof. Preferably each of c, d, and e is zero.

Preferably, the compound of formula (C) is 4,4'-difluorobenzophenone (DFBP). Preferably, the compound of formula (D) is hydroquinone. Preferably, the compound of formula (E) is resorcinol. In some embodiments, the compound of formula (C) is 4,4'-difluorobenzophenone (DFBP), the compound of formula (D) is hydroquinone, and the compound of formula (E) is resorcinol.

The method of the present invention is conducted in a solvent comprising diphenylsulfone. In some embodiments, the solvent comprises at least 50 wt. % of diphenylsulfone, based on the total weight of solvent in the reaction mixture, for example at least 60 wt. %, at least 70 wt. %, at least 80 wt. %, at least 90 wt. %, at least 95 wt. % or at least 98 wt. %, based on the total weight of solvent in the reaction mixture. In some embodiments, the solvent consists essentially in diphenylsulfone. In the method of the present invention, a solvent comprising limited amounts of impurities, as detailed in U.S. Pat. No. 9,133,111 to Solvay Advanced Polymers, LLC, is generally used.

The solvent of the present invention may comprise benzophenone and/or dibenzothiophene dioxide.

The method of the present invention is conducted in the presence of a base, for example selected from the group consisting of potassium carbonate ($K_2CO_3$), potassium tert-butoxide, sodium carbonate ($Na_2CO_3$), cesium carbonate ($Cs_2CO_3$) and sodium tert-butoxide. The base acts to deprotonate the components (D) and (E) during the condensation reaction. The condensation is preferably carried out in the presence potassium carbonate ($K_2CO_3$), sodium carbonate ($Na_2CO_3$) or a mixture of both.

The method of the present invention is terminated (or stopped) using at least one end-capping agent. End-capping agents are incorporated in the polymer. End-capping agents used in the method of the present invention notably include those represented by formula (F) below:

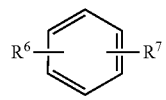

wherein
$R^6$ is F, Cl, or OH,
$R^7$ is C(O)—Ar—$R^{10}$, O—Ar—$R^{10}$, $SO_2$—Ar—$R^{10}$, Ar—$R^{10}$, an alkyl (e.g. a C1-C10 alkyl or a C1-C5 alkyl) or H, with Ar being an arylene group comprising at least one benzene ring (i.e. one benzene ring or several benzene rings), and
$R^{10}$ is F, Cl or H.

Preferably, $R^7$ is C(O)—Ar—$R^{10}$, Ar—$R^{10}$ or H with $R^{10}$ is F or H. More preferably, $R^{10}$ is F.

Preferably, R is F or OH. More preferably, $R^6$ is F.

$R^6$ and $R^7$ may be 1,2- or ortho-substitution on the phenylene cycle of formula (F) or they may be 1,3- or meta-substitution on the phenylene cycle. Alternatively, $R^6$ and $R^7$ may preferably be 1,4- or para-substitution on the phenylene cycle of formula (F).

In some embodiments, the end-capping agent is selected from the group consisting of 4,4'-difluorobenzophenone, phenol, 4-phenoxyphenol, 4-phenylphenol, 4-fluorobenzophenone, 3-fluorobenzophenone, 2-fluorobenzophenone, 4,4'-dichlorodiphenylsulfone, 4,4'difluorodiphenylsulfone and a mixture thereof.

Difluoro-compounds are preferably used as end-capping agents. In some embodiments, the end-capping agent is an excess of a difluoro-compound monomer. The end-capping agent used in the method of the present invention is preferably 4,4'-difluorobenzophenone.

The method of the present invention may comprise a step consisting in terminating (or stopping) the reaction using at least one terminating agent. Lithium chloride is one example of a terminating agent, which will terminate the reaction without being incorporating in the polymer backbone.

In some embodiments, the reaction is terminating with at least one end-capping agent and with at least one terminating agent. Preferably, 4,4'-difluorobenzophenone and lithium chloride are respectively used as end-capping agent and terminating agent in the method of the present invention.

In some embodiments, the step consisting in terminating the reaction comprises:
adding a first end capping agent in the reaction mixture and
adding a terminating agent in the reaction mixture, and
optionally adding a second end capping agent in the reaction mixture, the second end capping agent being preferably identical to the first end capping agent.

In some other embodiments, the step consisting in terminating the reaction comprises:
- in a first step, adding 4,4'-difluorobenzophenone (DFBP) in the reaction mixture,
- in a second step, adding lithium chloride (LiCl) in the reaction mixture, and
- optionally in a third step adding 4,4'-difluorobenzophenone (DFBP) or lithium chloride (LiCl) in the reaction mixture, preferably 4,4'-difluorobenzophenone (DFBP).

In some embodiments, the at least one end-capping agent is added to the reaction mixture at the beginning of the reaction.

In some embodiments, the concentration of the monomers [(C)+(D)+(E)] in the diphenylsulfone is at least 25 wt. %, preferably at least 28 wt. %, more preferably at least 31 wt. %.

In some embodiments, the concentration of the monomers [(C)+(D)+(E)] in the diphenylsulfone is at most 44 wt. %, preferably at most 42 wt. %, more preferably at most 40 wt. %.

In some embodiments, the temperature of the reaction mixture is kept at a temperature of at least 130° C., preferably at least 140° C., more preferably at least 150° C., for about one to 15 hours.

It is also preferable that the compounds (C), (D) and (E) are heated in the method of the invention at a first temperature of at least 130° C., preferably at least 140° C., more preferably at least 150° C. before being contacted with the base, preferably $Na_2CO_3$ and/or $K_2CO_3$. The reaction mixture is then heated at a temperature of at least 260° C., preferably at least 280° C., at a temperature ramp rate of less than 5° C./minute, preferably less than 3° C./minute and/or at a temperature ramp rate of more than 0.1° C./minute. As described in the Examples, once the final target temperature is attained, the reaction is generally continued for a limited time at this temperature, before being terminated.

The reaction mixture is polycondensed, within the temperature range, until the requisite degree of condensation is reached. The polycondensation time can be from 0.1 to 10 hours, preferably from 0.2 to 4 or from 0.5 to 3 hours, depending on the nature of the starting monomers and on the selected reaction conditions.

The inorganic constituents, for example sodium fluoride or potassium fluoride or excess of base, can be removed by suitable methods such as dissolving and filtering, screening or extracting, using various solvents (for example acetone and/or water at a pH between 1 and 12).

In some embodiments, the powder is dried at a temperature of at least 95° C., for example at least 100° C., for at least one hour, for example at least 2 hours, at least 5 hours, at least 10 hours or 12 hours.

The Polymer Composition

The PEEK-PEmEK copolymer can be desirably incorporated into polymer compositions. The polymer composition includes the PEEK-PEmEK copolymer and at least one of a reinforcing filler, as described below, or at least one additive, different from the reinforcing filler as described below, or a combination thereof. The polymer composition comprises at least 10 wt. %, at least 20 wt. %, at least 30 wt. % of the polymer composition, based on the total weight of the polymer composition. In some embodiments, the polymer composition comprises PEEK-PEmEK copolymer represents at least 50 wt. %, preferably at least 60 wt. %, at least 70 wt. %, at least 80 wt. %, at least 90 wt. %, at least 95 wt. %, at least 99 wt. % of the PEEK-PEmEK copolymer, based on the total weight of the polymer composition. In some embodiments, the polymer composition comprises less than 50 wt. %, preferably less than 45 wt. %, more preferably less than 40 wt. % of the PEEK-PEmEK copolymer, based on the total weight of the polymer composition.

Reinforcing Fillers

In some embodiments, the polymer composition includes at least one reinforcing filler. Reinforcing fillers are well known to those of skill in the art. They are preferably selected from fibrous and particulate fillers different from the pigments as described below. More preferably, the reinforcing filler is selected from mineral fillers (such as talc, mica, kaolin, calcium carbonate, calcium silicate, magnesium carbonate, boron nitride), glass fiber, carbon fibers, synthetic polymeric fiber, aramid fiber, aluminum fiber, titanium fiber, magnesium fiber, boron carbide fibers, boron nitride fibers, rock wool fiber, steel fiber, wollastonite, etc. Nano-scale reinforcing fillers can also be used. These fillers include: single and multi-wall carbon nanotubes, carbon nanofibers, graphene, graphene oxide, and nanoclays such as montmorillonite. Still more preferably, it is selected from mica, kaolin, calcium silicate, magnesium carbonate, glass fiber, carbon fibers and wollastonite.

Preferably, the filler is chosen from fibrous fillers. A particular class of fibrous fillers consists of whiskers, i.e. single crystal fibers made from various raw materials, such as $Al_2O_3$, SiC, BC, Fe and Ni.

In one embodiment of the present invention the reinforcing filler is chosen from wollastonite and glass fiber. Among fibrous fillers, glass fibers are preferred; they include chopped strand A-, E-, C-, D-, S-, T- and R-glass fibers, as described in chapter 5.2.3, p. 43-48 of Additives for Plastics Handbook, $2^{nd}$ edition, John Murphy.

Glass fibers optionally comprised in polymer composition may have a circular cross-section or a non-circular cross-section (such as an oval or rectangular cross-section).

When the glass fibers used have a circular cross-section, they preferably have an average glass fiber diameter of 3 to 30 μm and particularly preferred of 5 to 12 μm. Different sorts of glass fibers with a circular cross-section are available on the market depending on the type of the glass they are made of. One may notably cite glass fibers made from E- or S-glass.

In some embodiments, the glass fiber is standard E-glass material with a non-circular cross section. In some aspects, the polymer composition includes S-glass fibers with a round cross-section.

In some embodiments, the polymer composition includes at least one carbon fiber. As used herein, the term "carbon fiber" is intended to include graphitized, partially graphitized, and ungraphitized carbon reinforcing fibers or a mixture thereof. The carbon fibers can be obtained by heat treatment and pyrolysis of different polymer precursors such as, for example, rayon, polyacrylonitrile (PAN), aromatic polyamide or phenolic resin; carbon fibers may also be obtained from pitchy materials. The term "graphite fiber" is intended to denote carbon fibers obtained by high temperature pyrolysis (over 2000° C.) of carbon fibers, wherein the carbon atoms place in a way similar to the graphite structure. The carbon fibers are preferably chosen from the group consisting of PAN-based carbon fibers, pitch based carbon fibers, graphite fibers, and mixtures thereof.

The reinforcing fibers may be organic or inorganic. Suitable fibers for use as the reinforcing fiber component include, for example, carbon fibers, graphite fibers, glass fibers, such as E glass fibers, ceramic fibers, such as silicon carbide fibers, synthetic polymer fibers, such as aromatic polyamide fibers, polyimide fibers and polybenzoxazole fibers. The areal weight of a single layer or cross section of such fibers can vary, for example, from 50 to 600 g/m².

In some embodiments, the fibers comprise carbon fibers, glass fibers, or both carbon fibers and glass fibers. In some embodiments, the fibers comprise carbon fibers, including, for example, carbon fibers that exhibit a tensile strength of greater than or equal to 3.5 GigaPascals ("GPa") and a tensile modulus of greater than or equal to 200 GPa, as measured by ASTM D638.

The fibers may be in the form of whiskers, short fibers, continuous fibers, sheets, plies, and combinations thereof. Continuous fibers may further adopt any of unidirectional, multi-dimensional, non-woven, woven, knitted, stitched, wound, and braided configurations, as well as swirl mat, felt mat, and chopped mat structures. The fiber tows may be held in position in such configurations by cross-tow stitches, weft-insertion knitting stitches, or a small amount of resin, such as a sizing. As used herein "continuous fibers" are fibers having a length greater than 10 mm.

In some embodiments, the polymer composition comprises less than 60 wt. %, more preferably less than 50 wt. %, even more preferably less than 45 wt. %, most preferably less than 35 wt. % of reinforcing filler, based on the total weight of the polymer composition.

In some embodiments, the polymer composition comprises at least 10 wt. %, preferably at least 20 wt. %, preferably at least 25%, most preferably at least 30 wt. % of reinforcing filler, based on the total weight of the polymer composition.

Additives

In some embodiments, the polymer composition comprises at least one additive different from the reinforcing filler and from the PEEK-PEmEK copolymer, as above detailed, generally selected from the group consisting of (i) colorants such as a dye (ii) pigments such as titanium dioxide, zinc sulfide and zinc oxide (iii) light stabilizers, e.g. UV stabilizers (iv) heat stabilizers (v) antioxidants such as organic phosphites and phosphonites, (vi) acid scavengers (vii) processing aids (viii) nucleating agents (ix) internal lubricants and/or external lubricants (x) flame retardants (xi) smoke-suppressing agents (x) anti-static agents (xi) anti-blocking agents (xii) conductivity additives such as carbon black and carbon nanofibrils (xiii) plasticizers (xiv) flow modifiers (xv) extenders, and (xvi) metal deactivators.

In some embodiments, the polymer composition includes less than 20%, preferably less than 10%, more preferably less than 5% and even more preferably less than 2% of additives.

In some embodiments, the polymer composition comprises as an additive 40 wt. % or less of at least one poly(aryl ether sulfone) (PAES) selected from the group consisting of a polysulfone (PSU), a polyphenylsulfone (PPSU), and a poly(ether sulfone) (PES), based on total weight of the polymer composition.

In alternative embodiments, the PEEK-PEmEK copolymer, as above detailed, is the only polymeric component in the polymer composition. As used herein, the expression "polymeric component" means a compound having repeat units and a molecular weight of at least 2,000 g/mol. In some embodiments, the polymer composition includes less than 3 wt. %, 2 wt. %, 1 wt. %, 0.5 wt. % of a polymeric component other than the PEEK-PEmEK copolymer.

Methods of Making the Polymer Composition

The polymer composition can be prepared by a variety of methods involving intimate admixing of the components of the polymer composition, for example by dry blending, suspension or slurry mixing, solution mixing, melt mixing or a combination of dry blending and melt mixing. As used herein, the "components of the polymer composition" includes the PEEK-PEmEK copolymer, as above detailed, and at least one of the at least one reinforcing filler, the at least one additive, and of a combination thereof.

Typically, the dry blending of the components of the polymer composition is carried out by using high intensity mixers, such as Henschel-type mixers, paddle mixers or ribbon mixers to obtain the polymer composition as a physical mixture.

Alternatively, the intimate admixing of the components of the polymer composition is carried out by tumble blending based on a single axis or multi-axis rotating mechanism to obtain a physical mixture.

Alternatively, the slurry mixing of the components of the polymer composition is carried out by slurrying the components of the polymer composition using an agitator in an appropriate liquid, such as, for example, methanol, followed by filtering the liquid away, to obtain a powder mixture of the components of the polymer composition.

The solution mixing of the components of the polymer composition can be carried out by mixing the components with an agitator in at least one solvent such as, for example, diphenylsulfone, benzophenone, 4-chlorophenol, 2-chlorophenol, or meta-cresol.

In some embodiments, the method of making the polymer composition includes melt compounding the physical mixture. Conventional melt compounding devices, such as co-rotating and counter-rotating extruders, single screw extruders, co-kneaders, disc-pack processors and various other types of extrusion equipment can be used. Preferably, extruders, more preferably twin screw extruders can be used.

In some embodiments, the physical mixture is compounded in an extruder and then chopped into pellets or granules. The granules or pellets can then be further processed to manufacture additional shaped articles.

Shaped Articles and Methods of Making

Exemplary embodiments also include shaped articles comprising the above-described polymer composition and methods of making the shaped articles.

The shaped article can include one or more parts. When the shaped article is a single part, the single part preferably consists of the polymer composition.

Alternatively, the shaped article may consist of more than one part, one or more of which preferably consists of the polymer composition. When more than one part of the shaped article includes the polymer composition, each part may include the same polymer composition or a different polymer composition as described herein.

The weight of the polymer composition, based on the total weight of shaped article, is preferably greater than 1%, greater than 5%, greater than 10%, preferably greater than 15%, greater than 20%, greater than 30%, greater than 40%, greater than 50%, greater than 60%, greater than 70%, greater than 80%, greater than 90%, greater than 95%, greater than 99%.

The polymer composition may be well suited for the manufacture of articles useful in a wide variety of applications. For example, the surprising and advantageous properties of the PEEK-PEmEK copolymer described herein makes the polymer composition especially suitable for use in automotive applications such as magnet wire coatings in hybrid and electric vehicles, oil and gas applications such as downhole cable coatings, structural components for mobile electronic devices (e.g., framework or housing), thermoplastic composites for structural and transportation applications, electrostatic powder coatings on metal substrates for corrosion protection and abrasion resistance, and parts produced by additive manufacturing for a wide range of applications.

The term "mobile electronic device" is intended to denote any electronic device that is designed to be conveniently transported and used in various locations while exchanging/providing access to data, e.g. through wireless connections or mobile network connection. Representative examples of mobile electronic devices include mobile phones, personal digital assistants, laptop computers, tablet computers, radios, cameras and camera accessories, watches, calculators, music players, global positioning system receivers, portable games, hard drives and other electronic storage devices, and the like.

The shaped article may be selected from a large list of articles such as fitting parts; such as seals, in particular sealing rings, preferably backup seal rings, fasteners and the like; snap fit parts; mutually moveable parts; functional elements, operating elements; tracking elements; adjustment elements; carrier elements; frame elements; films; switches; connectors; wires, cables; bearings, housings, compressor components such as compressor valves and compressor plates, shafts, shells, or pistons.

In particular, the polymer composition is very well suited for use as a coating for wires or cables, as a structural part of a mobile electronic devices, or as a part produced by additive manufacturing. Thus, exemplary embodiments also include shaped articles made, at least in part, by the additive manufacturing methods described below using the polymer composition described above. Such shaped articles can be used in a variety of final applications such as implantable medical devices, dental prostheses, and brackets and complex shaped parts in the aerospace and automotive industries.

In particular, the polymer composition is well-suited for use as continuous fiber reinforced composite.

Methods of Making the Shaped Articles

The shaped articles described herein can be made from the polymer composition by injection molding, extrusion molding, compression molding, additive manufacturing (also called three-dimensional (3D) printing, for which the shaped articles may also be called 3D objects or 3D parts), continuous fiber impregnation, and continuous fiber composite lamination/consolidation or other shaping technologies.

In some embodiments, the method of making the shaped article or part thereof includes a step of compression molding or injection molding, and subsequent solidification of the polymer composition.

In some embodiments, the method for making the shaped article or shaped article or part thereof includes a step of coating. For example, the polymer composition can be applied to a wire as a coating by any suitable coating method, preferably by extrusion coating around a wire to form a coated wire, preferably a coated magnet wire.

Exemplary embodiments are also directed to methods of making shaped articles by additive manufacturing, where the shaped article is printed from the polymer composition, also called "part material". The methods include printing layers of the shaped article from the polymer composition as described below. The expression "part material" hereby refers to a polymeric composition comprising at least the PEEK-PEmEK copolymer, and intended to form at least a part of the 3D object. The part material is according to the present invention used as feedstocks to be used for the manufacture of shaped articles, 3D objects or part of 3D objects.

Additive manufacturing systems are used to print or otherwise build a shaped object from a digital representation of the shaped object by one or more additive manufacturing techniques. Examples of commercially available additive manufacturing techniques include extrusion-based techniques, selective laser sintering, powder/binder jetting, electron-beam melting, and stereolithography processes. For each of these techniques, the digital representation of the shaped object is initially sliced into multiple horizontal layers. For each layer, a tool path is then generated, which provides instructions for the particular additive manufacturing system to print the given layer.

For example, in an extrusion-based additive manufacturing system, a shaped article may be printed from a digital representation of the shaped article in a layer-by-layer manner by extruding and adjoining strips of the polymer composition. The polymer composition is extruded through an extrusion tip carried by a print head of the system, and is deposited as a sequence of roads on a platen in an x-y plane. The extruded material fuses to previously deposited material and solidifies as it cools. The position of the print head relative to the substrate is then incremented along a z-axis (perpendicular to the x-y plane), and the process is repeated to form a shaped article resembling the digital representation. An example of an extrusion-based additive manufacturing system is Fused Filament Fabrication (FFF), also known as Fused Deposition Modelling (FDM). Pellet Additive Manufacturing (PAM) is an example of a 3D printing method capable of printing raw materials as pellets.

As another example, in a powder-based additive manufacturing system, a laser is used to locally sinter powder into a solid part. A shaped article is created by sequentially depositing a layer of powder followed by a laser pattern to sinter an image onto that layer. An example of a powder-based additive manufacturing system is Selective Laser Sintering (SLS).

As another example, carbon-fiber composite shaped articles can be prepared using a continuous Fiber-Reinforced Thermoplastic (FRTP) printing method. This method is based on fused-deposition modeling (FDM) and prints a combination of fibers and resin.

The advantageous properties of the polymer composition discussed above make the polymer composition particularly suitable for additive manufacturing applications.

Accordingly, some embodiments include a method of making a shaped article comprising printing layers of the polymer composition to form the shaped article by an extrusion-based additive manufacturing system (for example FFF or PAM), a powder-based additive manufacturing system (for example SLS), or a continuous Fiber-Reinforced Thermoplastic (FRTP) printing method.

In some embodiments, the 3D printing method employs the copolymers as main elements of the part material, which can for example be shaped in the form of filaments or microparticles (with a regular shape such as spheres, or with a complex shape obtained by grinding/milling of pellets), to build a 3D object (e.g. a 3D model, a 3D article or a 3D part). The polymers may also be printed in the form of pellets.

Some embodiments include a filament including the polymer composition. Preferably, the filament is suitable for use in additive manufacturing methods as described above, such as FFF or FDM.

The term "filament" refers to a thread-like object or fiber including the polymer composition. The filament may have a cylindrical or substantially cylindrical geometry, or may have a non-cylindrical geometry, such as a ribbon-shaped filament. The filament may be hollow, or may have a core-shell geometry, with a different polymer composition comprising either the core or the shell.

When the filament has a cylindrical geometry, the diameter of the cross-section of the fiber preferably ranges from 0.5 to 5 mm, preferably from 0.8 to 4 mm, preferably from 1 mm to 3.5 mm. The diameter of the filament can be chosen to feed a specific FFF 3D printer. An example of filament diameter used in FFF processes is about 1.75 mm or about 2.85 mm. The filament is preferably made by extruding the polymer composition.

According to some embodiments, the polymer composition is in the form of microparticles or a powder, for example having an average diameter, also called $d_{50}$, ranging from 1 to 200 µm, preferably from 10 to 100 µm, preferably from 20 to 80 µm as measured by electron microscopy or laser scattering. Preferably, the microparticles, powder or powdered material are suitable for use in additive manufacturing methods as described above, such as SLS.

Selective laser sintering ("SLS"), one of the available additive manufacturing techniques, uses electromagnetic radiation from a laser to fuse powdered materials into a mass. The laser selectively fuses the powdered material by scanning cross-sections generated from the digital blueprint of the object on the surface of a powder bed. After a cross-section is scanned, the powder bed is lowered by one layer thickness, a new layer of material is applied, and the bed is rescanned. Locally full coalescence of polymer particles in the top powder layer is necessary as well as an adhesion with previous sintered layers. This process is repeated until the object is completed.

In some embodiments, the 3D printing method may comprise a step of depositing successive layers of the powder and a step of selectively sintering each layer prior to deposition of the subsequent layer. According to an embodiment, the step of printing layers comprises selective sintering by means of a high power energy source, for example a high power laser source such as an electromagnetic beam source.

In some embodiments, the powder may be heated before the sintering step to a temperature Tp (° C.), close to the melting point (Tm) of the PEEK-PEmEK copolymer. The preheating of the powder makes it easier for the laser to raise the temperature of the selected regions of layer of unfused powder to the melting point. The laser causes fusion of the powder only in locations specified by the input. Laser energy exposure is typically selected based on the polymer in use and to avoid polymer degradation.

The 3D object/article/part may be built on substrate, for example a horizontal substrate and/or on a planar substrate. The substrate may be moveable in all directions, for example in the horizontal or vertical direction. During the 3D printing process, the substrate can, for example, be lowered, in order for the successive layer of unsintered polymeric material to be sintered on top of the former layer of sintered polymeric material.

According to an embodiment, the 3D printing process further comprises a step consisting in producing a support structure. According to this embodiment, the 3D object/article/part is built upon the support structure and both the support structure and the 3D object/article/part are produced using the same AM method. The support structure may be useful in multiple situations. For example, the support structure may be useful in providing sufficient support to the printed or under-printing, 3D object/article/part, in order to avoid distortion of the shape 3D object/article/part, especially when this 3D object/article/part is not planar. This is particularly true when the temperature used to maintain the printed or under-printing, 3D object/article/part is below the re-solidification temperature of the powder.

The 3D printing method usually takes place using a printer. The SLS printer may comprise a sintering chamber and a powder bed, both maintained at determined at specific temperatures.

FFF 3D printers are, for example, commercially available from Apium, from Roboze, from Hyrel or from Stratasys, Inc. (under the trade name Fortus). SLS 3D printers are, for example, available from EOS Corporation under the trade name EOSINT® P. FRTP 3D printers are, for example, available from Markforged.

PAM 3D printers are, for example, commercially available from Pollen. BAAM (Big Area Additive Manufacturing) is an industrial sized, additive machine commercially available from Cincinnati Inc.

SLS 3D printers are, for example, available from EOS Corporation under the trade name EOSINT® P.

Method of Making the PEEK-PEmEK Composite

Exemplary embodiments are directed to methods of making PEEK-PEmEK composites comprising impregnating the reinforcing fibers described above with the polymer matrix described herein.

Various methods can be employed by which fibers may be impregnated with the polymer matrix, wherein the matrix is either in molten or particulate form, including, for example, powder coating, film lamination, extrusion, pultrusion, aqueous slurry, and melt impregnation, to form plies in the form of, for example, sheets or tapes of fibers that are at least partially impregnated with the polymer matrix. As used herein, "tape" means a strip of material with longitudinally extending reinforcement fibers that are aligned along a single axis of the strip material.

Plies of matrix impregnated fibers may be placed adjacent one another to form an unconsolidated composite laminate, such as a prepreg. The fiber reinforced layers of the laminate may be positioned with their respective fiber reinforcements in selected orientations relative to one another.

The plies may be stacked, manually or automatically, e.g., by automated tape layup using "pick and place" robotics, or advanced fiber placement wherein pre-impregnated tows of fibers are heated and compacted in a mold or on a mandrel, to form a composite laminate having desired physical dimensions and fiber orientations.

The layers of an unconsolidated laminate are typically not completely fused together and the unconsolidated composite laminate may exhibit a significant void content, e.g., greater than 20% by volume as measured by x-ray microtomography. Heat and/or pressure may be applied, or sonic vibration welding may be used, to stabilize the laminate and prevent the layers from moving relative to one another, e.g., to form a composite material "blank", as an intermediate step to allow handling of the composite laminate prior to consolidation of the composite laminate.

The composite laminate so formed is subsequently consolidated, typically by subjecting the composite laminate to heat and pressure, e.g., in a mold, to form a shaped fiber reinforced thermoplastic matrix composite article. As used herein, "consolidation" is a process by which the matrix material is softened, the layers of the composite laminate are pressed together, air, moisture, solvents, and other volatiles are pressed out of the laminate, and the adjacent plies of the composite laminate are fused together to form a solid, coherent article. Ideally, the consolidated composite article exhibits minimal, e.g., less than 5% by volume, more typically less than 2% by volume, void content as measured by x-ray microtomography.

The PEEK-PEmEK composite preferably comprises from 20 to 80 wt. % of reinforcing fibers and from 80 to 20 wt. % of the polymer matrix, based on the weight of the PEEK-PEmEK composite.

Composite Material/Articles

The PEEK-PEmEK copolymers described herein can be incorporated into composite materials/articles, including, but not limited to, components for aerospace applications.

In some embodiments, the composite articles are in the form of substantially bidimensional articles. Bidimensional articles include parts in which one dimension (thickness or height) is significantly less than the other two characterizing dimensions (length and width), for example, films and sheets. In some embodiments, the composite articles are three-dimensional parts. Three-dimensional parts include parts that substantially extend in the three dimensions of space in similar manner, including in the form of parts with complex geometries (e.g., concave or convex sections, possibly including undercuts, inserts, and the like).

The present invention therefore relates to composite materials, comprising from 20 to 80 wt. % of reinforcing fibers (as described above) and from 20 to 80 wt. % of the PEEK-PEmEK copolymer/composition of the invention, based on the total weight of the composite material.

In some embodiments, the composite article includes at least one portion having a thickness of at least 4 mm, preferably at least 5 mm.

Due to the unexpectedly improved melt stability of the polymer matrix a composite article including the polymer matrix may exhibit less than 2% voids in portions having a thickness greater than 5 mm.

In some embodiments, the toughness of the PEEK-PEmEK composite exceeds 75% of its initial toughness after being heated at a temperature ranging from 290° C. to 370° C. for 20 minutes, where toughness is measured as compression strength after impact using a 30 J impact energy per ASTM test method D7137/7136.

In some embodiments, the toughness of the PEEK-PEmEK composite exceeds 75% of its initial toughness after being heated at a temperature ranging from 290° C. to 370° C. for 20 minutes, where toughness is measured as mode 1 fracture toughness per ASTM 5228.

Polymer-Metal Junction and Methods of Making

In some embodiments, the shaped article includes a polymer-metal junction. The polymer-metal junction comprises the polymer composition, as described above, in contact with a metal substrate.

The metal substrate can include any metallic composition including, but not limited to, aluminum, copper, gold, iron, nickel, platinum, silver, steel, and blends or alloys thereof (e.g., brass and bronze). The metal substrate is preferably copper, steel, aluminum, or a combination thereof, most preferably aluminum.

In some embodiments, the metal substrate (e.g. an aluminum substrate) has a structured metal surface. "Structured metal surface" as used herein means a metal surface that has undergone any etching process to roughen the metal surface by removing at least part of the metal. Examples of structured metal surfaces include laser etched metal surfaces and chemically etched metal surfaces. In some embodiments, the metal surface is an un-etched metal surface.

In some aspects, the metal substrate is a nano-structured metal surface. "Nano-structured metal surface" means a metal surface that has been etched to have a nano-pitted surface with surface peaks and valleys having average depth, height and width dimensions in the nano-scale regime ranging from 10 to 1000 nm, preferably from 30 to 800 nm, and more preferably from 50 to 500 nm. In some embodiments, the metal substrate includes an NMT-treated metal surface. An "NMT-treated metal surface" means a nano-structured surface prepared by any etching/priming process described in EP1459882 B1, EP1559542 A1, or WO 2011123790 A1, the disclosures of which are incorporated herein by reference in their entireties.

In some embodiments, the metal substrate is a wire or cable. In alternative embodiments, the metal substrate is a part of a mobile electronic device.

In some embodiments, the polymer-metal junction includes a layer of the polymer composition having a thickness ranging from 0.025 mm to 3 mm.

The polymer-metal junction can be made by contacting the polymer composition as described herein with the metal substrate, preferably a structured metal surface, more preferably a nano-structured metal surface, most preferably an NMT-treated metal surface. For example, the polymer composition may be deposited on or over-molded onto the metal substrate using any suitable melt-processing and deposition method. In particular, the polymer-metal junction may be made by injection or compression molding, or coating the polymer composition onto the metal substrate. The polymer-metal junction can also be formed by an electrostatic or solvent-borne powder coating process. In some aspects, the polymer-metal junction can be formed by an extrusion process for coating a wire or cable. In alternative embodiments the polymer-metal junction is made by an additive manufacturing process.

In some aspects, the polymer composition exhibits a lap shear strength of at least 15 MPa, preferably at least 18 MPa, to a nano-structured aluminum surface as measured according to ASTM D1002 and described in the Examples below.

Exemplary embodiments will now be described in the following non-limiting examples.

EXAMPLES

Materials

KetaSpire® PEEK KT-880P and KT-820P are PEEK polymers available from Solvay Specialty Polymers USA, LLC.

Cypek® PEKK DS-E is an amorphous poly(ether ketone ketone) (PEKK) available from Solvay Specialty Polymers USA.

Hydroquinone, photo grade, available from Eastman, USA. It contained 0.32 wt. % moisture. This information was used to adapt the charge weights. All weights indicated include moisture.

Resorcinol, ACS reagent grade, available from Aldrich, USA.

4,4'-Biphenol, polymer grade is available from SI, USA.

4,4'-Difluorobenzophenone, polymer grade, is available from Jintan, China.

Diphenylsulfone (polymer grade), available from Proviron (99.8% pure).

Sodium carbonate, light soda ash, available from Solvay S.A., France, dried at 120° C./100 Torr for 12 h.

Potassium carbonate with a d90<45 µm, available from Armand products, dried at 120° C./100 Torr for 12 h.

Lithium chloride (anhydrous grade), available from Acros.

Preparation of Polymer Compositions of Examples and Comparative Examples

The examples conducted allowed to help understand the difference between the present invention and prior art documents.

CE1 is KetaSpire® PEEK KT-820P
Comparative Examples CE2 to CE10 are PEEK-PEDEK copolymers
CE11 is Cypek® PEKK DS-E
Examples E12 to E17 are examples according to the invention: run in diphenylsulfone, with an excess of fluorinated monomer, a mixture of $Na_2CO_3$ and $K_2CO_3$ as base, with an end capping step with excess fluorinated monomer at the end of the reaction
CE18 is a 40/60 PEEK-PEmEK copolymer
CE19 was run according to JP 011/98624 in NMP
CE20 and 21 were run according to Rao et al, 1992 in sulfolane
CE23, CE25, CE31 were run according to Lee et al, 1993 in DPS
Examples E13, 14, 22, 24 and 28 are examples according to the invention: run in DPS, with an excess of fluorinated monomer and an end capping step
Examples CE26 to CE29 and E30 were run under a variety of conditions to understand the impact of the different process parameters: excess or not of fluorinated monomer, end capping or no end capping Comparative Example 1 (CE1)

Comparative Example 1 was KetaSpire® PEEK KT-820P.

Comparative Example 2 (CE2): Preparation of 95/5 PEEK-PEDEK Copolymer

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 121.86 g of diphenylsulfone (DPS), 25.707 g of hydroquinone, 2.281 g of 4,4'-biphenol (BP) and 54.261 g of 4,4'-difluorobenzophenone (4,4'-DFBP). The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 150° C. At 150° C., a mixture of 26.8764 g of $Na_2CO_3$ and 0.1693 g of $K_2CO_3$ was added via a powder dispenser to the reaction mixture over 30 minutes. At the end of the addition, the reaction mixture was heated to 320° C. at 1° C./minute. After 10 minutes at 320° C., 6.415 g of 4,4'-difluorobenzophenone (4,4'-DFBP) were added to the reaction mixture while keeping a nitrogen purge on the reactor. After 5 minutes, 0.418 g of lithium chloride (LiCl) were added to the reaction mixture. 10 minutes later, another 2.138 g of 4,4'-difluorobenzophenone (4,4'-DFBP) were added to the reactor and the reaction mixture was kept at temperature for 15 minutes.

The reactor content was then poured from the reactor into a SS pan and cooled. The solid was broken up and ground in an attrition mill through a 2 mm screen. DPS and salts were extracted from the mixture with acetone and water at pH between 1 and 12. The powder was then removed from the reactor and dried at 120° C. under vacuum for 12 hours yielding 65 g of a white powder.

The repeat unit of the polymer is

Comparative Examples 3-10: Preparation of Various PEEK-PEDEK Copolymers

The same procedure as Comparative Example 2 was followed except using the following amounts of reagents (Tables 1 and 2):

TABLE 1

| | CE3 | CE4 | CE5 | CE6 |
|---|---|---|---|---|
| | | PEEK-PEDEK | | |
| | 90/10 | 85/15 | 80/20 | 75/25 |
| DPS (g) | 123.45 | 127.70 | 127.70 | 128.21 |
| Hydroquinone (g) | 24.354 | 23.508 | 21.861 | 20.295 |
| BP (g) | 4.562 | 6.993 | 9.207 | 11.405 |
| 4,4'-DFBP (g) | 54.261 | 55.531 | 54.835 | 54.368 |
| $Na_2CO_3$ (g) | 26.876 | 27.530 | 27.339 | 26.876 |
| $K_2CO_3$(g) | 0.169 | 0.173 | 0.171 | 0.169 |
| $1^{st}$ step termination 4,4'-DFBP (g) | 6.415 | 3.822 | 6.577 | 6.415 |
| $2^{nd}$ step termination LiCl (g) | 0.418 | 1.061 | 1.285 | 0.418 |
| $3^{rd}$ step termination 4,4'-DFBP (g) | 2.138 | 2.184 | 2.192 | 2.138 |

TABLE 2

| | CE7 | CE8 | CE9 | CE10 |
|---|---|---|---|---|
| | | PEEK-PEDEK | | |
| | 70/30 | 60/40 | 50/50 | 40/60 |
| DPS (g) | 129.80 | 287.65 | 288.96 | 145.87 |
| Hydroquinone (g) | 18.942 | 35.123 | 28.718 | 9.940 |
| BP (g) | 13.686 | 39.477 | 48.415 | 25.138 |
| 4,4'-DFBP (g) | 54.368 | 116.455 | 114.258 | 49.831 |
| $Na_2CO_3$ (g) | 26.876 | 58.141 | 57.044 | 24.682 |
| $K_2CO_3$(g) | 0.1524 | 0.366 | 0.359 | 0.1555 |
| $1^{st}$ step termination 4,4'-DFBP (g) | 6.415 | 13.878 | 13.616 | 5.892 |
| $2^{nd}$ step termination LiCl (g) | 0.418 | 0.904 | 0.887 | 0.384 |
| $3^{rd}$ step termination 4,4'-DFBP (g) | 2.138 | 4.626 | 4.539 | 1.964 |

Comparative Example 11 (CE11)

Comparative Example 11 was Cypek® PEKK DS-E.

Inventive Example 12 (E12): Preparation of 95/5 PEEK-PEmEK Copolymer

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 128.62 g of diphenylsulfone, 27.491 g of hydroquinone, 1.443 g of resorcinol and 57.854 g of 4,4'-difluorobenzophenone. The flask content was evacuated under vacuum and then filled

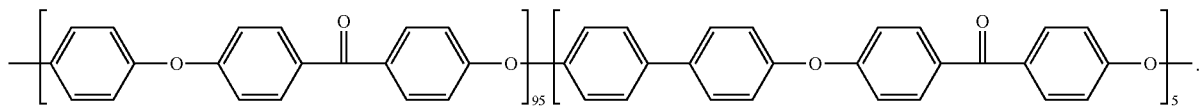

with high purity nitrogen (containing less than 10 ppm O2). The reaction mixture was then placed under a constant nitrogen purge (60 mL/min).

The reaction mixture was heated slowly to 150° C. At 150° C., a mixture of 28.741 g of $Na_2CO_3$ and 0.181 g of $K_2CO_3$ was added via a powder dispenser to the reaction mixture over 30 minutes. At the end of the addition, the reaction mixture was heated to 320° C. at 1° C./minute. After 13 minutes at 320° C., 6.860 g of 4,4'-difluorobenzophenone were added to the reaction mixture while keeping a nitrogen purge on the reactor. After 5 minutes, 0.447 g of lithium chloride were added to the reaction mixture. 10 minutes later, another 2.287 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenylsulfone and salts were extracted from the mixture with acetone and water at pH between 1 and 12. The powder was then removed from the reactor and dried at 100° C. under vacuum for 12 hours yielding 70 g of a light brown powder.

The melt viscosity measured by capillary rheology at 410° C., 46 $s^{-1}$ was 1.12 kN·s/m$^2$.

Inventive Examples 13-17 and Comparative Example 18: Preparation of Various PEEK-PEmEK Copolymers The same procedure as Example 12 was followed except using the following amounts of reagents (table 3):

TABLE 3

|  | E13 | E14 | E15 | E16 | E17 | CE18 |
|---|---|---|---|---|---|---|
| PEEK-PEmEK | 90/10 | 80/20 | 70/30 | 60/40 | 50/50 | 40/60 |
| DPS (g) | 128.62 | 396.9 | 396.9 | 396.9 | 128.62 | 128.62 |
| Hydroquinone (g) | 26.044 | 52.133 | 45.616 | 39.099 | 14.469 | 11.575 |
| Resorcinol (g) | 2.885 | 12.995 | 19.493 | 25.990 | 14.427 | 17.312 |
| 4,4'-DFBP (g) | 57.854 | 132.08 | 132.08 | 132.08 | 58.655 | 58.655 |
| $Na_2CO_3$ (g) | 28.741 | 64.723 | 64.723 | 64.723 | 28.741 | 28.741 |
| $K_2CO_3$ (g) | 0.181 | 0.408 | 0.408 | 0.408 | 0.181 | 0.181 |
| $1^{st}$ step termination 4,4'-DFBP (g) | 6.860 | 15.449 | 15.449 | 15.449 | 6.860 | 13.720 |
| $2^{nd}$ step termination LiCl (g) | 0.447 | 1.006 | 1.006 | 1.006 | 0.447 | 0.447 |
| $3^{rd}$ step termination 4,4'-DFBP (g) | 2.287 | 5.150 | 5.150 | 5.150 | 2.287 | 2.287 |
| Melt viscosity (kN · s/m$^2$) | 0.70 | 2.36 | 2.92 | 2.24 | 2.57 | 13.6 |

Analytical Methods

Determination of Melting Temperature (Tm)

The melting temperature (Tm) was determined as the peak temperature of the melting endotherm on the second heat scan in a differential scanning calorimeter (DSC) according to ASTM D3418-03 and E794-06 and using heating and cooling rates of 20° C./min.

A TA Instruments DSC Q20 was used with nitrogen as carrier gas (99.99800 purity, 50 mL/min). Temperature and heat flow calibrations were performed using indium. Sample size was 5 to 7 mg. The weight was recorded ±0.01 mg. The heat cycles were:

1st heat cycle: 30.00° C. to 400.00° C. at 20.00° C./min, isothermal at 400.00° C. for 1 min;

1st cool cycle: 400.00° C. to 30.00° C. at 20.00° C./min, isothermal for 1 min;

2nd heat cycle: 30.00° C. to 400.00° C. at 20.00° C./min, isothermal at 400.00° C. for 1 min.

The melting temperature (Tm) was determined as the peak temperature of the melting endotherm on the second heat scan. The melting of the composition was taken as the area over a linear baseline drawn from 160° C. to a temperature above the last endotherm.

Determination of Glass Transition Temperature (Tg)

The glass transition temperature (Tg) was measured in a differential scanning calorimeter (DSC) according to ASTM D3418-03 and E1356-03, and was recorded from the second heat up using the half height method.

Determination of Heat of Fusion (ΔH)

The heat of fusion (ΔH) of polymer powder was determined as the area under the melting endotherm on the second heat scan in a differential scanning calorimeter (DSC) according to ASTM D3418-03 and E793-06, and using heating and cooling rates of 20° C./min. The heat of fusion (ΔH) is determined on the second heat scan and is taken as the area over a linear baseline drawn from above the glass transition temperature (Tg) to a temperature above end of the endotherm.

The heat of fusion (ΔH) of molded parts was determined as the area under the melting endotherm on the first heat scan in a differential scanning calorimeter (DSC) according to ASTM D3418-03 and E793-06, and using heating and cooling rates of 20° C./min.

For filled compositions, the heat of fusion (ΔH) measured was corrected for filler content to express the heat of fusion (ΔH) relative to the polymer content only, excluding the filler.

Determination of the Melt Viscosity

The melt viscosity was measured using a capillary rheometer pursuant to ASTM D3835 standard. Readings were taken after 10 minute dwell time at 410° C. and a shear rate of 46.3 $s^{-1}$ using a tungsten-carbide die with the following characteristics: diameter=1.016 mm, length=20.32 mm, cone angle=120°

Thermal Properties of Polymer Powders

The thermal properties observed for the polymer powders of the Examples and Comparative Examples are shown in Table 4 below.

TABLE 4

| Example | Polymer | Tg (° C.) | Tc (° C.) | Tm (° C.) | ΔH fusion (J/g) (Powder) |
|---|---|---|---|---|---|
| CE1 | PEEK - KT-820 | 149 | 287 | 339 | 49 |
| CE2 | PEEK-PEDEK (95/5) | 150 | 288 | 335 | 56 |
| CE3 | PEEK-PEDEK (90/10) | 150 | 279 | 327 | 48 |
| CE4 | PEEK-PEDEK (85/15) | 151 | 261 | 320 | 47 |
| CE5 | PEEK-PEDEK (80/20) | 153 | 256 | 313 | 40 |
| CE6 | PEEK-PEDEK (75/25) | 153 | 242 | 305 | 30 |
| CE7 | PEEK-PEDEK (70/30) | 153 | 233 | 296 | 23 |
| CE8 | PEEK-PEDEK (60/40) | 157 | 232 | 317 | 28 |
| CE9 | PEEK-PEDEK (50/50) | 159 | 284 | 349 | 38 |
| CE10 | PEEK-PEDEK (40/60) | 159 | 322 | 371 | 50 |
| CE11 | PEKK DS-E | 155 | ND* | ND | ND |
| E12 | PEEK-PEmEK (95/5) | 154 | 290 | 333 | 60 |
| E13 | PEEK-PEmEK (90/10) | 146 | 252 | 325 | 54 |
| E14 | PEEK-PEmEK (80/20) | 143 | 249 | 307 | 47 |
| E15 | PEEK-PEmEK (70/30) | 140 | 199 | 288 | 36 |
| E16 | PEEK-PEmEK (60/40) | 134 | 174 | 266 | 10 |
| E17 | PEEK-PEmEK (50/50) | 129 | ND | 253 | 3 |
| CE18 | PEEK-PEmEK (40/60) | 131 | ND | ND | ND |

*ND = Not detected. The composition was amorphous.

Table 4 includes melting point (Tm) and heat of fusion ΔH data for a variety of comparative PEEK-PEDEK copolymers and inventive PEEK-PEmEK copolymers over a range of PEEK/PEDEK and PEEK/PEmEK mole ratios.

As the relative amount of PEDEK repeat units in the PEEK-PEDEK copolymers of Comparative Examples 2 to 10 increased, the heat of fusion (ΔH) and melting temperatures (Tm) generally decreased from a high of ΔH=56 J/g and Tm=335° C. (Comparative Example 2, PEEK-PEDEK (95/5)) to a low of ΔH=23 J/g and Tm=296° C. (Comparative Example 7, PEEK-PEDEK (70/30)); however, from Comparative Examples 8 (PEEK-PEDEK (60/40)) to 10 (PEEK-PEDEK (40/60)), the trend reversed, and both heat of fusion (ΔH) and melting temperatures (Tm) increased.

In surprisingly contrast, as the relative amount of $R_{PEmEK}$ repeat units was increased over Examples 12 to 17, the inventive PEEK-PEmEK copolymers exhibited a much different behaviour. First, the PEEK-PEmEK copolymers achieved a higher heat of fusion (ΔH) for a given melting temperature (Tm) over the range 333° C. to 296° C. than did the comparative PEEK-PEDEK copolymers, and second, the PEEK-PEmEK copolymers unexpectedly achieved melting temperatures (Tm) as low as 43° C. lower than the lowest melting temperature (Tm) observed for the comparative PEEK-PEDEK copolymers. In other words, in contrast to the comparative examples, the PEEK-PEmEK copolymers of the invention were unexpectedly found to satisfy the inequality, $\Delta H \geq -0.0005(Tm)^2 + 1.008(Tm) - 226.33$, the boarder of which is represented by the curve $\Delta H = -0.0005(Tm)^2 + 1.008(Tm) - 226.33$.

In addition, Examples 12 and 13 surprisingly exhibited melting temperatures (Tm) less than that of PEEK (Comparative Example 1) with heats of fusion as much as 28% greater than that observed for PEEK.

Evaluation of Injection Molded Compositions

Type I ASTM tensile bars of the copolymers of Comparative Examples 1 and 7-11 and Examples 14-16 were injection molded on a Wasp Mini-Jector® injection molding machine.

Evaluation of Compression Molded Compositions

A 762 mm×762 mm×3.2 mm plaque was prepared from the polymer by compression molding of 25 g of polymer under the following conditions:
 preheat at 385° C.,
 385° C./20 minutes, 2000 kg-f
 385° C./2 minutes, 2700 kg-f
 cool down to 30° C. over 40 minutes, 2000 kg-f The 762 mm×762 mm×3.2 mm compression molded plaques were machined into Type V ASTM tensile specimens Determination of Tensile Properties Tensile properties were measured according to ASTM D638 at room temperature low speed (0.2-in/min for type I, 0.05-in/min for type V bars), except for Comparative Examples 5-7 (which were tested at high speed (2.0-in/min)) on as-molded and annealed specimens (200° C./3 h in air for CE1, and 180° C./3 h in air for Comparative Examples 5-7, 11, and Examples 14-16.

The specimens of Comparative Examples CE7-CE11 could not be annealed without significant deformation. Results are presented in Tables 5 and 6. For each sample, at least 3 specimen bars were tested, the average of these 3-5 samples is represented in the tables with the standard deviation presented in brackets.

TABLE 5

Properties of As-Molded Compositions (injection molded)

| | CE1 | CE7 | CE6 | CE5 | CE11 | E14 | E15 | E16 |
|---|---|---|---|---|---|---|---|---|
| Composition | PEEK | PEEK-PEDEK (70/30) | PEEK-PEDEK (75/25) | PEEK-PEDEK (80/20) | PEKK DS-E | PEEK-PEmEK (80/20) | PEEK-PEmEK (70/30) | PEEK-PEmEK (60/40) |
| Tm molded plaque (° C.) | 342 | 298 | 311 | 317 | 315 | 313 | 295 | 275 |
| Tensile Modulus, ksi, | 538 [3.05]* | 380 [1.68] | 391 [7.33] | 398 [1.97] | 515 [83] | 636 [18.4] | 618 [24.1] | 553 [54.3] |
| Tensile Strain at Break, %, | 37 [13] | 180 [54] | 240 [7.4] | 250 [3.7] | 84 [33] | 14 [9.4] | 7.9 [12] | 22 [7.9] |
| Tensile Strain at Yield, %, | 5.4 [0.08] | 5.7 [0.06] | 5.5 [0.15] | 5.4 [0.07] | 5.3 [0.17] | 4.1 [0.04] | 3.95 [—]** | 3.7 [0.2] |
| Tensile Strength at Break, psi, | 10800 [656] | 12500 [1740] | 14400 [192] | 14400 [119] | 9980 [832] | 12900 [851] | 11300 [2590] | 9330 [1120] |
| Tensile Strength at Yield, psi, | 13900 [40.3] | 10100 [28.0] | 10100 [52.0] | 10200 [76.0] | 12800 [65.8] | 14000 [60.9] | 13995 [—] | 11800 [148] |
| ΔH fusion (J/g) (molded plaque) | 41.3 | 8.2 | 7.9 | 9.0 | 6.5 | 36.7 | 35.6 | 18.7 |

*Standard deviations are shown in brackets.
**"—" indicates only one specimen yielded, so no standard deviation was calculated.

As shown in Table 5 above, when molded into plaques, the PEEK-PEmEK copolymers of the invention unexpectedly exhibited:
1) a significantly higher tensile modulus than any of the comparative polymers, including PEEK (Comparative Examples 1 and 7-11), and
2) heats of fusion significantly higher—as much as 300% higher—than any of the comparative low melting temperature (Tm) polymers of Comparative Examples 7 to 11.

TABLE 6

Properties of Molded Compositions After Annealing (injection molded)

|  | CE1† | E14 | E15 | E16 |
|---|---|---|---|---|
| Tm (° C.) | 339 | 307 | 288 | 266 |
| Annealing T (° C.)/time (h) | 200/3 | 180/3 | 180/3 | 180/3 |
| Tensile Modulus, ksi, | 538 [3.05]* | 693 [10.9] | 661 [17] | 638 [35.7] |
| Tensile Strain at Break, %, | 37 [13] | 6.9 [6] | 1.5 [0.14] | 3.5 [3.3] |
| Tensile Strain at Yield, %, | 5.4 [0.08] | 3.74 [0.07] | NY** | 3.6 [—]*** |
| Tensile Strength at Break, psi, | 10800 [656] | 11800 [2870] | 8800 [684] | 8960 [709] |
| Tensile Strength at Yield, psi, | 13900 [40.3] | 14550 [18.65] | NY | 12435 [—] |
| ΔH fusion (J/g) | 41.1 | 41.5 | 35.6 | 25.3 |

*Standard deviations are shown in brackets.
**NY = Not yielding.
***"[—]" indicates that only one specimen yielded, so no standard deviation was calculated.
†The compositions of Comparative Examples CE7-CE11 were not evaluated after annealing because the annealing resulted in significant deformation of the specimens.

As shown in Table 6 above, after annealing, the PEEK-PEmEK copolymers of the invention exhibited:
1) a melting temperature (Tm) as much as 73° C. less than that of PEEK (CE),
2) a tensile modulus as much as 29% greater than that of PEEK, and
3) in the case of Examples 14 and 15, a heat of fusion (ΔH) on par with that of PEEK.

This surprising combination of properties make these materials particularly well suited for applications requiring a good chemical resistance and a lower processing temperature.

Determination of Fluorine Concentration in Polymers by Combustion Ion Chromatography Method For combustion ion chromatography (IC) analysis a clean, pre-baked, dry ceramic sample boat was placed onto an analytical balance, and the balance was zeroed. Approximately 20 mg of polymer sample was weighed into the boat and weight was recorded to 0.0001 g. The boat with sample was placed in the combustion furnace set with an inlet temperature of 900° C. and an outlet temperature of 1000° C. The combusted sample and argon carrier gas is passed through 18.2 MΩ ultrapure water, and injected autonomously into an IC system equipped with a conductivity detector.

Combustion IC analysis was performed using a Dionex ICS 2100 IC system, equipped with a Dionex IonPac AS19 IC column and guard column (or equivalent), Dionex CRD 200 4 mm suppressor set at 50 mA, as well as a, GA-210 gas absorption unit HF-210 furnace, and ABC-210 boat controller, all from Mitsubishi Analytech.

The elution gradient for the method is as follows
0-10 minutes: 10 mM KOH
10-15 minutes: steady, constant increase to 20 mM KOH
15-30 minutes: 20 mM KOH The instrument was calibrated using a 3-point calibration from a NIST traceable 7-anion mixture supplied by AllTech with analyte concentration between 0.1-3.0 mg/L for F⁻ and 0.2-6.0 mg/L for Cl⁻. A linear calibration curve was obtained in a whole range of concentrations with a correlation coefficient better than 0.9999 for each analyte. A control sample is run to verify the machine is operating correctly before any samples are analyzed. The concentration of anions in the sample was calculated with the following equation:

$$A=(B*C)/(D)$$

Where:
A=concentration of element in the sample in mg/kg
B=anion in the solution analyzed by IC in mg/L
C=volume of the solution analyzed by IC in mL
D=sample weight in mg used in the procedure.

Determination of Elemental Impurities Such as Sodium, Potassium, Calcium in PEEK-PEmEK Polymers by ICP-OES A clean, dry platinum crucible was placed onto an analytical balance, and the balance was zeroed. One half to 3 grams of polymer sample was weighed into a boat and its weight was recorded to 0.0001 g. The crucible with sample was placed in a muffle furnace (Thermo Scientific Thermolyne F6000 Programmable Furnace). The furnace was gradually heated to 525° C. and held at that temperature for 10 hours to dry ash the sample. Following ashing, the furnace was cooled down to room temperature, and the crucible was taken out of the furnace and placed in a fume hood. The ash was dissolved in diluted hydrochloric acid. The solution was transferred to a 25 mL volumetric flask, using a polyethylene pipette. The crucible was rinsed twice with approximately 5 mL of ultrapure water (R<18 MΩcm) and the washes were added to a volumetric flask to effect a quantitative transfer. Ultrapure water was added to total 25 mL in the flask. A stopper was put on the top of the flask and the contents were shaken well to mix.

ICP-OES analysis was performed using an inductively-coupled plasma emission spectrometer Perkin-Elmer Optima 8300 dual view. The spectrometer was calibrated using a set of NIST traceable multi-element mixed standards with analyte concentrations between 0.0 and 10.0 mg/L. A linear calibration curve was obtained in a range of concentrations with a correlation coefficient better than 0.9999 for each of 48 analytes. The standards were run before and after every ten samples to ensure instrument stability. The results were reported as an average of three replicates. The concentration of elemental impurities in the sample was calculated with the following equation:

$$A=(B*C)/(D)$$

where:
A=concentration of element in the sample in mg/kg (=wt.ppm)
B=element in the solution analyzed by ICP-OES in mg/L
C=volume of the solution analyzed by ICP-OES in mL
D=sample weight in grams used in the procedure.

CE19: Preparation of PEEK-PEmEK (80/20) in NMP/Toluene (JP 011/98624)

In a 1 L 4-neck reaction flask fitted with a stirrer, a $N_2$ inlet tube, a Claisen adapter with a thermocouple plunging in the reaction medium, and a Dean-Stark trap filled with toluene with a condenser and a dry ice trap were introduced 361 g of N-methylpyrrolidinone (NMP), 24.6646 g of hydroquinone, 6.166 g of resorcinol, 61.096 g of 4,4'-difluorobenzophenone, 34.129 g of $Na_2CO_3$ and 163 mL of toluene. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 195° C. The reaction mixture was maintained at 195° C. to remove water by azeotropic distillation with toluene, for 90 minutes. Toluene was kept refluxing back into the reactor. The temperature was then increased to 200° C. The mixture was held at 200° C. for 4 hours then cooled down to room temperature ° C. The mixture was coagulated in a Waring blender containing 1 L of methanol. The precipitated polymer was filtered on Büchner funnel then washed again 3 times with 1000 mL of water/methanol (1/19 vol/vol) at room temperature for 30 minutes.

The polymer powder was then dried at 100° C. under vacuum for 12 hours yielding 101.2 g of a brown powder.

The melt viscosity measured by capillary rheology at 410° C., 46 $s^{-1}$ was 6.85 $kN·s/m^2$. The Inherent viscosity measured in $H_2SO_4$ was 0.75 dL/g at 25° C. and 0.4 wt/vol %.

CE20: Preparation of PEEK-PEmEK (75/25) in sulfolane/toluene (Rao et al, 1992)

In a 1 L 4-neck reaction flask fitted with a stirrer, a $N_2$ inlet tube, a Claisen adapter with a thermocouple plunging in the reaction medium, and a Dean-Stark trap with a condenser and a dry ice trap were introduced 441 g of sulfolane, 8.258 g of hydroquinone, 2.753 g of resorcinol, 21.820 g of 4,4'-difluorobenzophenone, 19.998 g of $K_2CO3$ and 171 mL of toluene. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 150° C. The reaction mixture was maintained at 150° C. to remove water by azeotropic distillation with toluene. Toluene was kept refluxing back into the reactor. After 40 minutes, no more water was collected, some toluene was removed from the mixture via the Dean-Star trap and the temperature was increased to 230° C. The mixture was held at 230° C. for 2 hours then cooled down to 100° C. The mixture was coagulated in a Waring blender containing 1 L of demineralized water. The precipitated polymer was filtered on Büchner funnel then washed again twice with 500 mL of methanol at reflux for 30 minutes then 4 times with 500 mL demineralized water at reflux for 30 minutes.

The polymer powder was then dried at 100° C. under vacuum for 12 hours yielding 25.8 g of a brown powder.

The melt viscosity measured by capillary rheology at 410° C., 46 $s^{-1}$ was 0.30 $kN·s/m^2$. The Inherent viscosity measured in $H_2SO_4$ was 1.29 dL/g at 25° C. and 0.4 wt/vol %.

CE21: Preparation of PEEK-PEmEK (75/25) in Sulfolane/Toluene (Rao et al, 1992)

The same procedure as for example 19 was followed except that, at the end of the hold at 230° C., 1.001 g of 4-fluorobenzophenone was added to the reaction mixture, which was then held at 230° C. for 15 minutes before being cooled down to 100° C. The polymer isolation procedure was the same as for example 19 to yield 27.8 of a brown powder.

The melt viscosity measured by capillary rheology at 410° C., 46 $s^{-1}$ was 0.80 $kN·s/m^2$. The Inherent viscosity measured in $H_2SO_4$ was 0.79 dL/g at 25° C. and 0.4 wt/vol %.

Examples 22, 24 and 30: Preparation of Various PEEK-PEmEK Copolymer

The same procedure as Example 12 was followed except using the following amounts of reagents (Table 7):

TABLE 7

|  | E22 | E24 | E30 |
|---|---|---|---|
|  |  | PEEK-PEmEK |  |
|  | 75/25 | 75/25 | 80/20 |
| DPS (g) | 128.13 | 396.9 1 | 150.38 |
| Hydroquinone (g) | 26.706 | 45.625 | 22.095 |
| Resorcinol (g) | 7.186 | 19.492 | 5.506 |
| 4,4'-DFBP (g) | 58.431 | 132.085 | 55.968 |
| $Na_2CO_3$ (g) | 28.632 | 65.035 | 34.965 |
| $K_2CO_3$(g) | 0.180 | 0.204 | 0.408 |
| $1^{st}$ step termination 4,4'-DFBP (g) | 6.834 | 15.449 | 6.546 |
| $2^{nd}$ step termination LiCl (g) | 0.891 | 2.013 | 0.853 |
| $3^{rd}$ step termination 4,4'-DFBP (g) | 2.287 | 5.149 | 2.182 |
| Melt viscosity (kN · s/$m^2$) | 2.91 | — | 1.38 |
| Inherent viscosity (dL/g) | 0.95 | — | 0.64 |

CE23: Preparation of 70/30 PEEK-PEmEK Copolymer According to Lee et al, 1993

The procedure of Lee et al was reproduced at larger scale to allow the production of larger quantities. The reaction time was adapted in order to obtain a molecular weight similar to the other examples.

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 150.38 g of diphenylsulfone, 19.270 g of hydroquinone, 8.258 g of resorcinol and 54.550 g of 4,4'-difluorobenzophenone. The flask content was evacuated under vacuum and then filled with high purity nitrogen (containing less than 10 ppm O2). The reaction mixture was then placed under a constant nitrogen purge (60 mL/min).

The reaction mixture was heated slowly to 140° C. At 140° C., a 34.965 g of $K_2CO_3$ was transferred to the reaction mixture over less than 1 minute. At the end of the addition, the reaction mixture was heated to 180° C. and held at 180° C. for 1 hn then heated up to 200° C. The mixture was held at 200° C. until becoming viscous (202 minutes). The mixture was then heated up to 230° C. and held at 230° C. for 35 minutes, then heated up to 260° C., held at 260° C. for 30 minutes. The mixture was then heated up to 280° C. and held at 280° C. for 84 minutes until becoming viscous. The reactor content was then poured from the reactor into a SS pan and cooled. The solid was broken up and ground in an attrition mill through a 2 mm screen. Diphenylsulfone and salts were extracted from the mixture with acetone and water at pH between 1 and 12. The powder was then removed from the reactor and dried at 120° C. under vacuum for 12 hours yielding 63 g of a brown powder.

The melt viscosity measured by capillary rheolology at 410° C., 46 s$^{-1}$ was 4.19 kN·s/m$^2$. The Inherent viscosity measured in H$_2$SO$_4$ was 0.77 dL/g at 25° C. and 0.4 wt/vol %.

CE 25 and CE31: Preparation of Two PEEK-PEmEK Copolymers According to Lee et al, 1993

The same procedure as for CE 23 was followed but with the following raw materials amounts:

TABLE 8

|  | CE25 | CE31 |
|---|---|---|
|  | PEEK-PEmEK | |
|  | 80/20 | 90/10 |
| DPS (g) | 150.38 | 150.38 |
| Hydroquinone (g) | 22.022 | 24.775 |
| Resorcinol (g) | 5.506 | 2.753 |
| 4,4'-DFBP (g) | 54.550 | 54.550 |
| K$_2$CO$_3$ (g) | 34.965 | 34.965 |
| Melt viscosity (kN · s/m$^2$) | 2.46 | 5.19 |
| Inherent viscosity (dL/g) | 0.83 | 0.87 |

The temperature heat up ramp was
CE25: 180° C.—1 h; 200° C.—130 min; 230° C.—10 min; 260° C.—22 min; 280° C.—7 min; 300° C.—final temperature—50 minutes
CE31: 180° C.—1 h; 200° C.—13 min; 230° C.—20 min; 260° C.—41 min; 280° C.—75 min; 300° C.—30 min; 320° C.—final temperature—119 minutes CE 26: Preparation of 80/20 PEEK-PEmEK Copolymer In a 500 mL 4-neck reaction flask fitted with a stirrer, a N$_2$ inlet tube, a Claisen adapter with a thermocouple plunging in the reaction medium, and a Dean-Stark trap with a condenser and a dry ice trap were introduced 150.38 g of diphenylsulfone, 22.095 g of hydroquinone, 5.506 g of resorcinol and 54.550 g of 4,4'-difluorobenzophenone. The flask content was evacuated under vacuum and then filled with high purity nitrogen (containing less than 10 ppm O$_2$). The reaction mixture was then placed under a constant nitrogen purge (60 mL/min).

The reaction mixture was heated slowly to 150° C. At 150° C., 34.965 g of K$_2$CO$_3$ was added via a powder dispenser to the reaction mixture over 60 minutes. At the end of the addition, the reaction mixture was heated to 300° C. at 1° C./minute. After 79 minutes at 300° C., 6.546 g of 4,4'-difluorobenzophenone were added to the reaction mixture while keeping a nitrogen purge on the reactor. After 5 minutes, 0.853 g of lithium chloride were added to the reaction mixture. 10 minutes later, another 2.182 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenylsulfone and salts were extracted from the mixture with acetone and water at pH between 1 and 12. The powder was then removed from the reactor and dried at 120° C. under vacuum for 12 hours yielding 65 g of a light brown powder.

The melt viscosity measured by capillary rheolology at 410° C., 46 s$^{-1}$ was 5.55 kN·s/m$^2$. The Inherent viscosity measured in H$_2$SO$_4$ was 0.88 dL/g at 25° C. and 0.4 wt/vol %.

E28 & E30—CE 27 & CE29: Preparation of Various PEEK-PEmEK Copolymers

The same procedure as for CE 26 was followed but with the following raw materials amounts:

TABLE 9

|  | CE27 | E28 | CE29* | E30 |
|---|---|---|---|---|
|  | PEEK-PEmEK | | | |
|  | 80/20 | 80/20 | 80/20 | 80/20 |
| DPS (g) | 168.18 | 369.38 | 150.38 | 150.38 |
| Hydroquinone (g) | 22.095 | 58.33 | 22.095 | 22.095 |
| Resorcinol (g) | 5.506 | 14.537 | 5.506 | 5.506 |
| 4,4'-DFBP (g) | 54.550 | 147.180 | 55.968 | 55.968 |
| Na$_2$CO$_3$ (g) | 27.557 | 72.752 | 27.557 | — |
| K$_2$CO$_3$ (g) | 0.138 | 0.365 | 0.138 | 34.965 |
| 1$^{st}$ step termination 4,4'-DFBP (g) | 6.546 | 17.281 | no | 6.546 |
| 2$^{nd}$ step termination LiCl (g) | 0.853 | 2.251 | no | 0.853 |
| 3$^{rd}$ step termination 4,4'-DFBP (g) | 2.182 | 5.761 | no | 2.182 |
| Melt viscosity (kN · s/m$^2$) | 3.83 | — | 5.33 | 1.38 |
| Inherent viscosity (dL/g) | 0.92 | 0.64 | 1.01 | 0.64 |

*There was no end capping reagent added at the end of the reaction, the reaction mixture was simply poured from the reactor into a SS pan and cooled to room temperature.

TABLE 10 thermal properties

| Example | Polymer | Solvent | Na$_2$CO$_3$/K$_2$CO$_3$ (mol/mol/mol bisphenol) | Excess DFBP | End cap | Tg (° C.) | Tc (° C.) | Tm (° C.) | ΔH fusion (J/g) (Powder) | ΔH fusion (J/g) minimum per eq1 |
|---|---|---|---|---|---|---|---|---|---|---|
| CE19 | PEEK-PEmEK (80/20) | NMP | 115.0/0.0 | No | No | 145 | 194 | 299 | 15 | 30 |
| E14 | PEEK-PEmEK (80/20) | DPS | 103.5/0.50 | Yes | Yes | 143 | 249 | 307 | 47 | 36 |
| CE20 | PEEK-PEmEK (75/25) | Sulfolane | 0/144.7 | No | No | 144 | 181 | 294 | 6 | 27 |
| CE21 | PEEK-PEmEK (75/25) | NMP | 0/144.7 | No | Yes | 144 | 190 | 295 | 5 | 28 |
| E22 | PEEK-PEmEK (75/25) | DPS | 103.5/0.50 | Yes | Yes | 137 | 235 | 298 | 41 | 30 |
| CE23 | PEEK-PEmEK (70/30) | DPS | 0/101.2 | No | No | 142 | 201 | 290 | 32 | 24 |
| E24 | PEEK-PEmEK (70/30) | DPS | 104/0.3 | Yes | Yes | 137 | 200 | 290 | 33 | 24 |
| CE25 | PEEK-PEmEK (80/20) | DPS | 0/101.2 | No | No | 149/168 | 221 | 305 | 39 | 35 |
| CE26 | PEEK-PEmEK (80/20) | DPS | 0/101.2 | No | Yes | 149 | 224 | 307 | 37 | 36 |
| CE27 | PEEK-PEmEK (80/20) | DPS | 104/0.4 | No | Yes | 144 | 229 | 307 | 39 | 36 |

TABLE 10-continued thermal properties

| Example | Polymer | Solvent | Na$_2$CO$_3$/K$_2$CO$_3$ (mol/mol/mol bisphenol) | Excess DFBP | End cap | Tg (° C.) | Tc (° C.) | Tm (° C.) | ΔH fusion (J/g) (Powder) | ΔH fusion (J/g) minimum per eq1 |
|---|---|---|---|---|---|---|---|---|---|---|
| E28 | PEEK-PEmEK (80/20) | DPS | 104/0.4 | Yes | Yes | 144 | 234 | 310 | 52 | 38 |
| CE29 | PEEK-PEmEK (80/20) | DPS | 104/0.4 | Yes | No | 147 | 223 | 307 | 40 | 36 |
| E30 | PEEK-PEmEK (80/20) | DPS | 0/101.2 | Yes | Yes | 145 | 240 | 311 | 47 | 39 |
| CE31 | PEEK-PEmEK (90/10) | DPS | 0/101.2 | No | No | 149 | 266 | 323 | 49 | 47 |
| E13 | PEEK-PEmEK (90/10) | DPS | 104/0.5 | Yes | Yes | 146 | 252 | 325 | 54 | 48 |

TABLE 11 tensile properties (compression molded)

| Example | Polymer | Solvent | Na$_2$CO$_3$/K$_2$CO$_3$* | XS DFBP | End cap | IV (dL/g) | MV (kPa-s) | Tm (° C.) | Modulus (ksi) | Tensile strength at yield (psi) | Tensile strength per Eq. 3 (psi) |
|---|---|---|---|---|---|---|---|---|---|---|---|
| CE25 | PEEK-PEmEK (80/20) | DPS | 0/101.2 | No | No | 0.83 | 2.46 | 305 | 471 [110] | 13500 [148] | 13920 |
| CE26 | PEEK-PEmEK (80/20) | DPS | 0/101.2 | No | Yes | 0.88 | 5.55 | 307 | 454 [44] | 137.00 [307] | 14007 |
| CE27 | PEEK-PEmEK (80/20) | DPS | 104/0.4 | No | Yes | 0.92 | 3.83 | 307 | 485 [58] | 13700 [120] | 14007 |
| E28 | PEEK-PEmEK (80/20) | DPS | 104/0.4 | Yes | Yes | 0.64 | — | 310 | 632 [18.8] | 14900 [292] | 14102 |
| CE29 | PEEK-PEmEK (80/20) | DPS | 104/0.4 | Yes | No | 1.01 | 5.33 | 307 | 647 [171] | 14000 [246] | 14007 |
| E30 | PEEK-PEmEK (80/20) | DPS | 0/101.2 | Yes | Yes | 0.64 | 1.38 | 311 | 660 [99] | 14900 [149] | 14124 |

*(mol/mol/mol bisphenol)

TABLE 12

Fluorine content (inert EG)

| Example | Polymer | Na$_2$CO$_3$/K$_2$CO$_3$ (mol/mol/mol bisphenol) | XS DFBP | End cap | IV (dL/g) | MV (kPa-s) | [F] (μmol/g) | [F] * MV$^{0.05}$ (μmol/g)*(kN/m$^2$)$^{0.05}$ |
|---|---|---|---|---|---|---|---|---|
| CE23 | PEEK-PEmEK (70/30) | 0/101.2 | No | No | 0.71 | 4.19 | 160 | 172 |
| E24 | PEEK-PEmEK (70/30) | 104/0.3 | Yes | Yes | — | — | 212 | — |
| CE25 | PEEK-PEmEK (80/20) | 0/101.2 | No | No | 0.83 | 2.46 | 95 | 100 |
| CE26 | PEEK-PEmEK (80/20) | 0/101.2 | No | Yes | 0.88 | 5.55 | 127 | 138 |
| CE27 | PEEK-PEmEK (80/20) | 104/0.4 | No | Yes | 0.92 | 3.83 | 154 | 165 |
| E28 | PEEK-PEmEK (80/20) | 104/0.4 | Yes | Yes | 0.64 | — | 201 | — |
| CE29 | PEEK-PEmEK (80/20) | 104/0.4 | Yes | No | 1.01 | 5.33 | 146 | 159 |
| E30 | PEEK-PEmEK (80/20) | 0/101.2 | Yes | Yes | 0.64 | 1.38 | 168 | 171 |
| CE31 | PEEK-PEmEK (90/10) | 0/101.2 | No | No | 0.87 | 5.19 | 108 | 117 |
| E13 | PEEK-PEmEK (90/10) | 104/0.5 | Yes | Yes | — | 0.70 | — | — |

As shown in Table 10, the polymer prepared according to D2 and D3 (CE19, CE20 and CE21) presents an enthalpy of fusion below 15 J/g and thus not considered useful for industrial application. This is due to the fact that sulfolane and NMP are not good solvent for the polymer and do not allow the synthesis of good quality polymer.

As shown in Table 10, the tensile properties of the polymer prepared according to D3 (CE23, CE25 and CE31) are lower than the ones for the same polymer made using the process according to the invention (Ex. 24, 28, 13).

Further analysis shows that the tensile properties of polymer made in the absence of an excess of fluorinated monomer in the initial recipe (CE25-CE27, CE29) are all lower the properties of polymer made in the presence of an excess of fluorinated monomer (E 28 and E30) and use of an end capping agent at the end of the reaction.

Table 12 shows the data for [F]. In the case of 4,4'-difluorobenzophenone being used as end capping agent, the concentration of inert end groups [inert EG] can be evaluated by elemental fluorine analysis. For all the examples in Table 12, the samples were also analyzed for residual process metals (sodium, potassium, lithium, calcium) by ICP-OES and shown to contain less than 5 μmol/g of fluoride from inorganic source, indicating the concentration in fluorine represents accurately the concentration in inert groups. The data shows that PEEK-PEmEK samples according to the invention (>160 μmol inert EG) present better mechanical properties than PEKK-PEmEK Should the disclosure of any patents, patent applications, and publications which are incorporated herein by reference conflict with the description of the present application to the extent that it may render a term unclear, the present description shall take precedence.

The invention claimed is:

1. A method of making a PEEK-PEmEK copolymer, comprising:
   a. reacting in a solvent comprising diphenylsulfone, in the presence of a base:
   at least one difluoro-compound of formula (C):

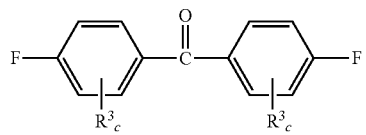

with a mixture of di-hydroxy compounds of formulas (D) and (E):

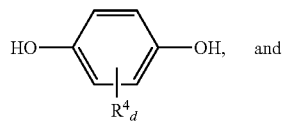

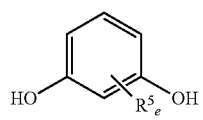

in a molar ratio (D)/(E) ranging from 95/5 to 45/55, in a molar ratio (C)/(D)+(E)≥1.005
   wherein
   each R3, R4, and R5, equal to or different from each other, is independently at each occurrence selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium, and
   each c, d, and e is independently selected from the group consisting of integers ranging from 0 to 4, and
   b. terminating the reaction with at least one end-capping agent,
   wherein the PEEK-PEmEK copolymer has a concentration of inert groups [inert EG] of at least 163 μmol/g and a heat of fusion (ΔH) >15 J/g.

2. The method of claim 1, wherein the compound of formula (C) is 4,4'-difluorobenzophenone (DFBP), the compound of formula (D) is hydroquinone, and/or the compound of formula (E) is resorcinol.

3. The method of claim 1, wherein the base is selected from the group consisting of Na2CO3, K2CO3 and a mixture of both.

4. The according to formula (F) below:

wherein

R6 is F, Cl, or OH,

R7 is C(O)—Ar-R10, O-Ar-R10, SO2-Ar-R10, Ar-R10, an alkyl or H, with Ar being an arylene group comprising at least one benzene ring, and R10 is F, Cl or H.

5. The method of claim 1, wherein the termination comprises:

adding an end-capping agent in the reaction mixture, adding a terminating agent in the reaction mixture, and optionally adding a second end capping agent in the reaction mixture, the second end capping agent being identical to the first end capping agent.

6. The method of claim 1, wherein the compounds of formulas (C), (D) and (E) are heated to a temperature of at least 130° C. before being contacted with the base.

7. The method of claim 1, wherein the concentration of the monomers in the solvent comprising diphenylsulfone is at least 25 wt. %.

8. A PEEK-PEmEK copolymer obtained by the method of claim 1.

9. A PEEK-PEmEK copolymer having a concentration of inert groups [inert EG] of at least 163 μmol/g, wherein the heat of fusion (ΔH) >15 J/g, wherein the heat of fusion (ΔH) is determined as the area under the melting endotherm on the second heat scan in a differential scanning calorimeter (DSC) according to ASTM D3418-03 and E793-06, and using heating and cooling rates of 20° C./min.

10. The PEEK-PEmEK copolymer of claim 9, comprising at least 50 mol %, collectively, of repeat units (RPEEK) and repeat units (RPEmEK), relative to the total number of repeat units in the PEEK-PEmEK copolymer, wherein:

(a) repeat units (RPEEK) are repeat units of formula (A):

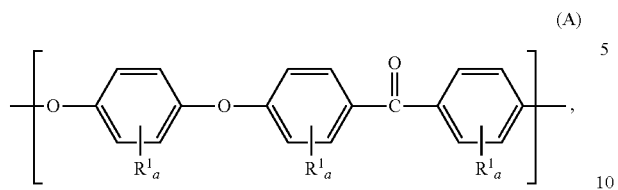

and
(b) repeat units (RPEmEK) are repeat units of formula (B):

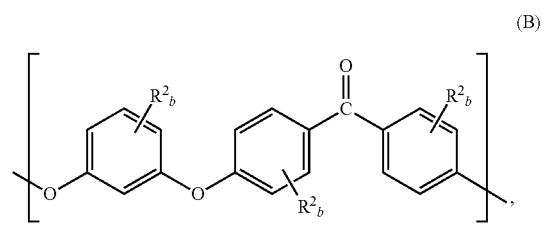

wherein
each $R^1$ and $R^2$, equal to or different from each other, is independently at each occurrence selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium,
each a and b is independently selected from the group consisting of integers ranging from 0 to 4, and
the PEEK-PEmEK copolymer includes the repeat units $R_{PEEK}$ and $R_{PEmEK}$ in a molar ratio $R_{PEEK}/R_{PEmEK}$ ranging from 95/5 to 45/55.

11. The PEEK-PEmEK copolymer of claim 9, wherein:
the repeat units (RPEEK) are repeat units of formula (A-1):

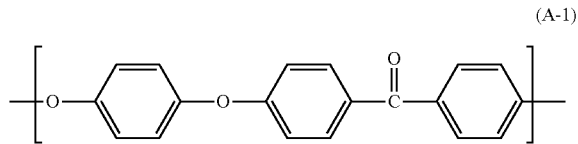

the repeat units (RPEmEK) are repeat units of formula (B-1):

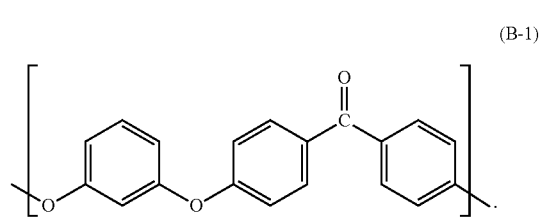

12. The PEEK-PEmEK copolymer of claim 9, wherein the PEEK-PEmEK copolymer meets the following inequality:

$$\Delta H \geq -0.0005(Tm)^2 + 1.008(Tm) - 226.33$$

wherein:
$\Delta H$ is the heat of fusion of PEEK-PEmEK copolymer in J/g, and
Tm is the melting temperature of the PEEK-PEmEK copolymer in °C. measured as the peak temperature of the melting endotherm on the second heat scan in a differential scanning calorimeter (DSC) according to ASTM D3418-03 and E794-06 and using heating and cooling rates of 20° C./min.

13. A polymer composition comprising:
(i) the PEEK-PEmEK copolymer of claim 9, and
(ii) at least one of a reinforcing filler, an additive, or a combination thereof.

14. A part material in the shape of a filament or a powder, for making a shaped article by printing layers of the article, the part material comprising the PEEK-PEmEK copolymer of claim 9.

15. A process for the manufacture of a shaped article by printing layers of the article using a 3D printer, comprising using the part material of claim 14.

16. A polymer-metal junction comprising a metal substrate in contact with the polymer composition of claim 13.

17. A composite material, comprising:
from 20 to 80 wt. % of reinforcing fibers and
from 20 to 80 wt. % of the PEEK-PEmEK copolymer of claim 9,
based on the total weight of the composite material.

18. The polymer-metal junction of claim 16, being a coating on a wire or cable or a part of a mobile electronic device.

* * * * *